March 29, 1932.  W. FERRIS ET AL  1,851,502
HYDRAULIC CONTROL
Filed March 5, 1931    12 Sheets-Sheet 5

Inventors
WALTER FERRIS.
HENRY F. PATRICK.
By Wesley P Merrill
Attorney

March 29, 1932.  W. FERRIS ET AL  1,851,502
HYDRAULIC CONTROL
Filed March 5, 1931   12 Sheets-Sheet 6
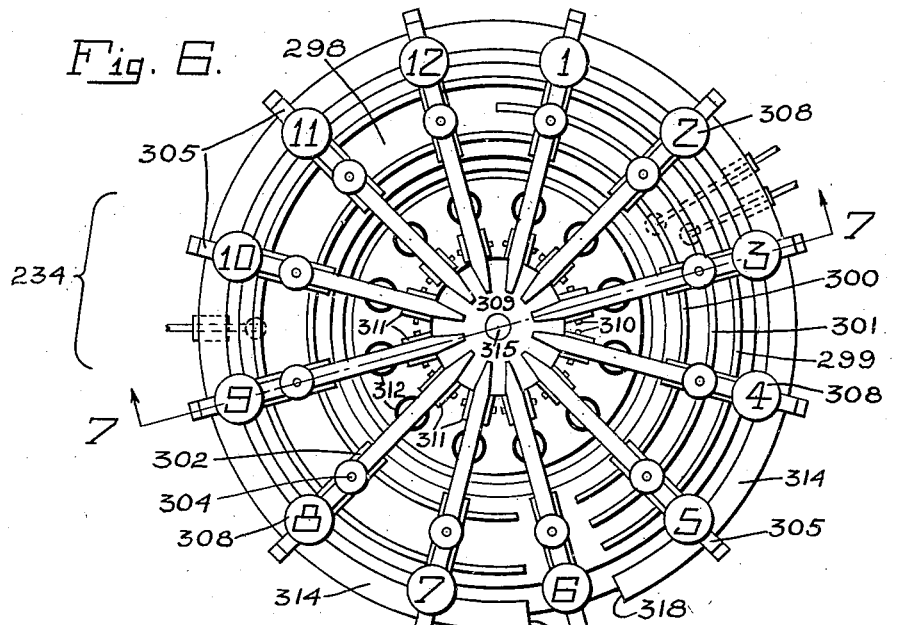
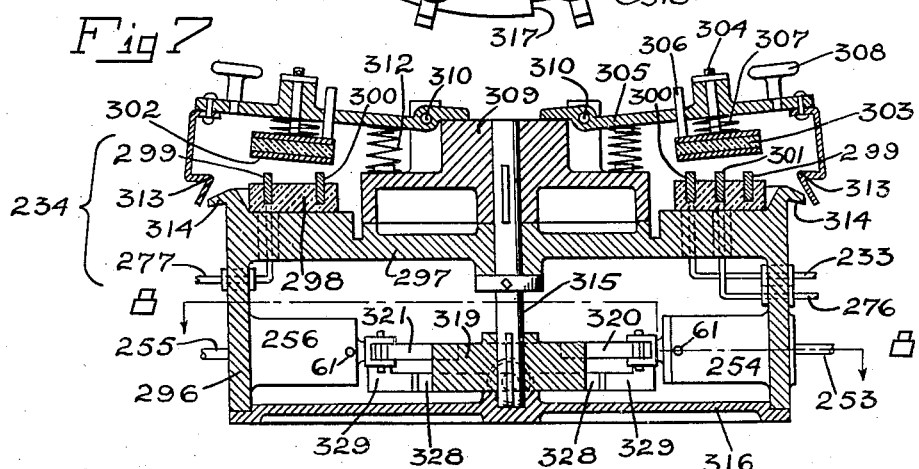
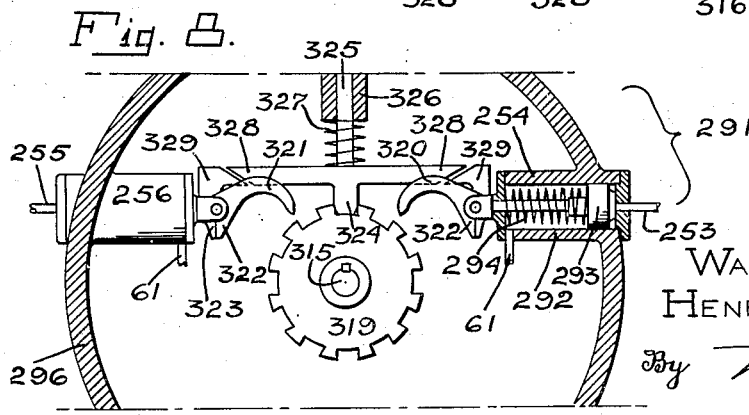
Inventors
WALTER FERRIS.
HENRY F. PATRICK.
By Wesley Merritt
Attorney

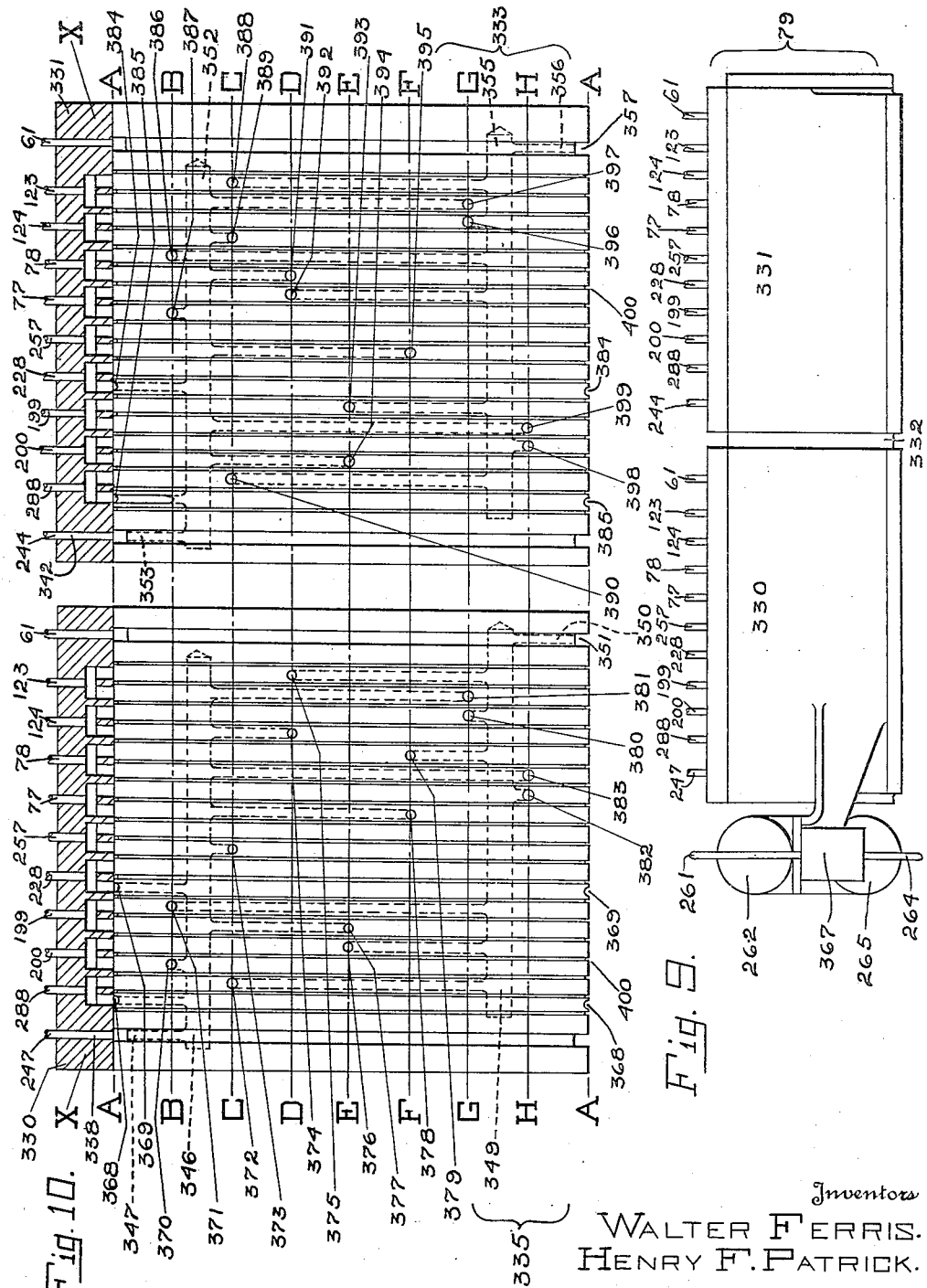

March 29, 1932.  W. FERRIS ET AL  1,851,502
HYDRAULIC CONTROL
Filed March 5, 1931   12 Sheets-Sheet 8

Inventors
WALTER FERRIS.
HENRY F. PATRICK.
By Wesley P. Merrill
Attorney

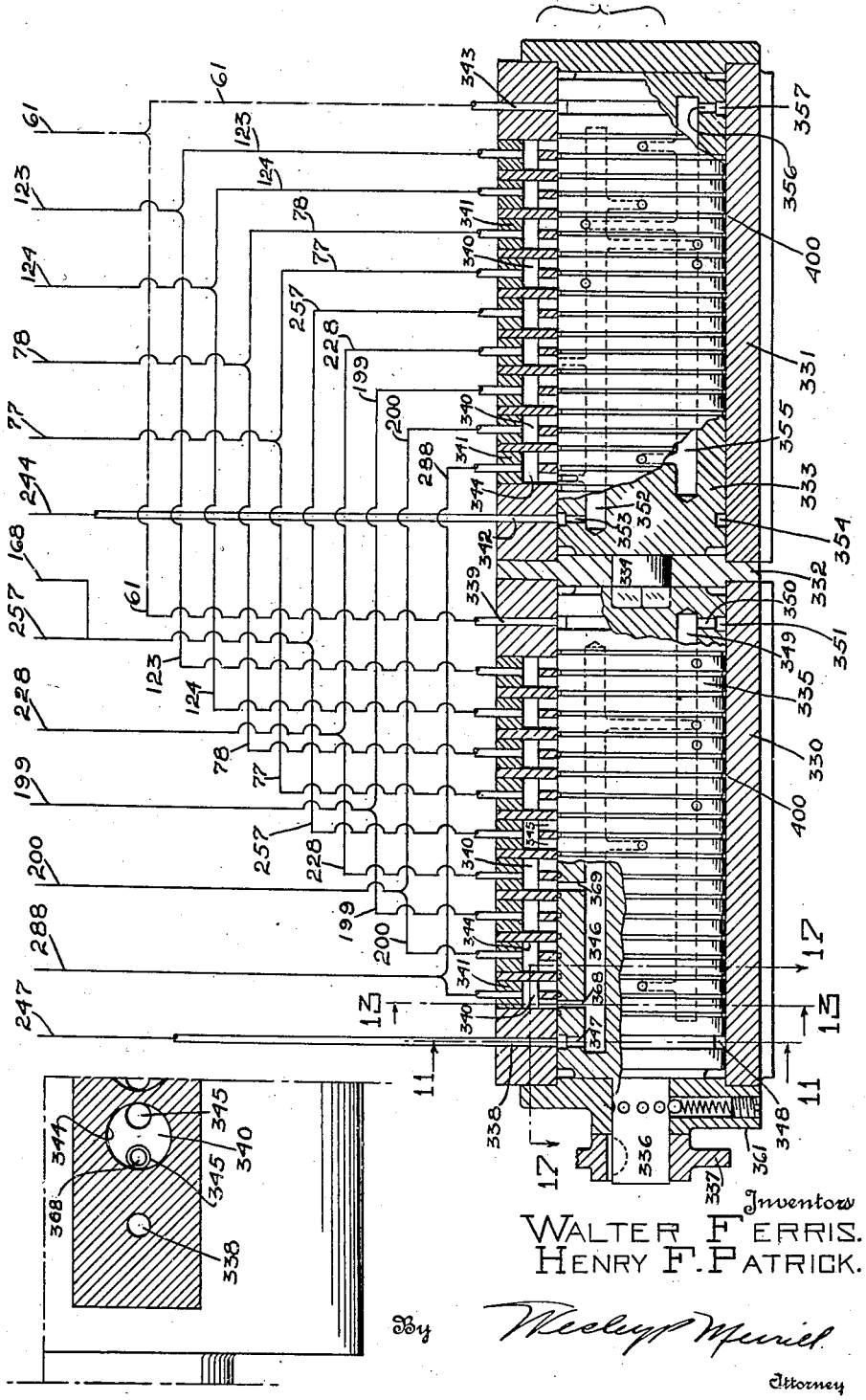

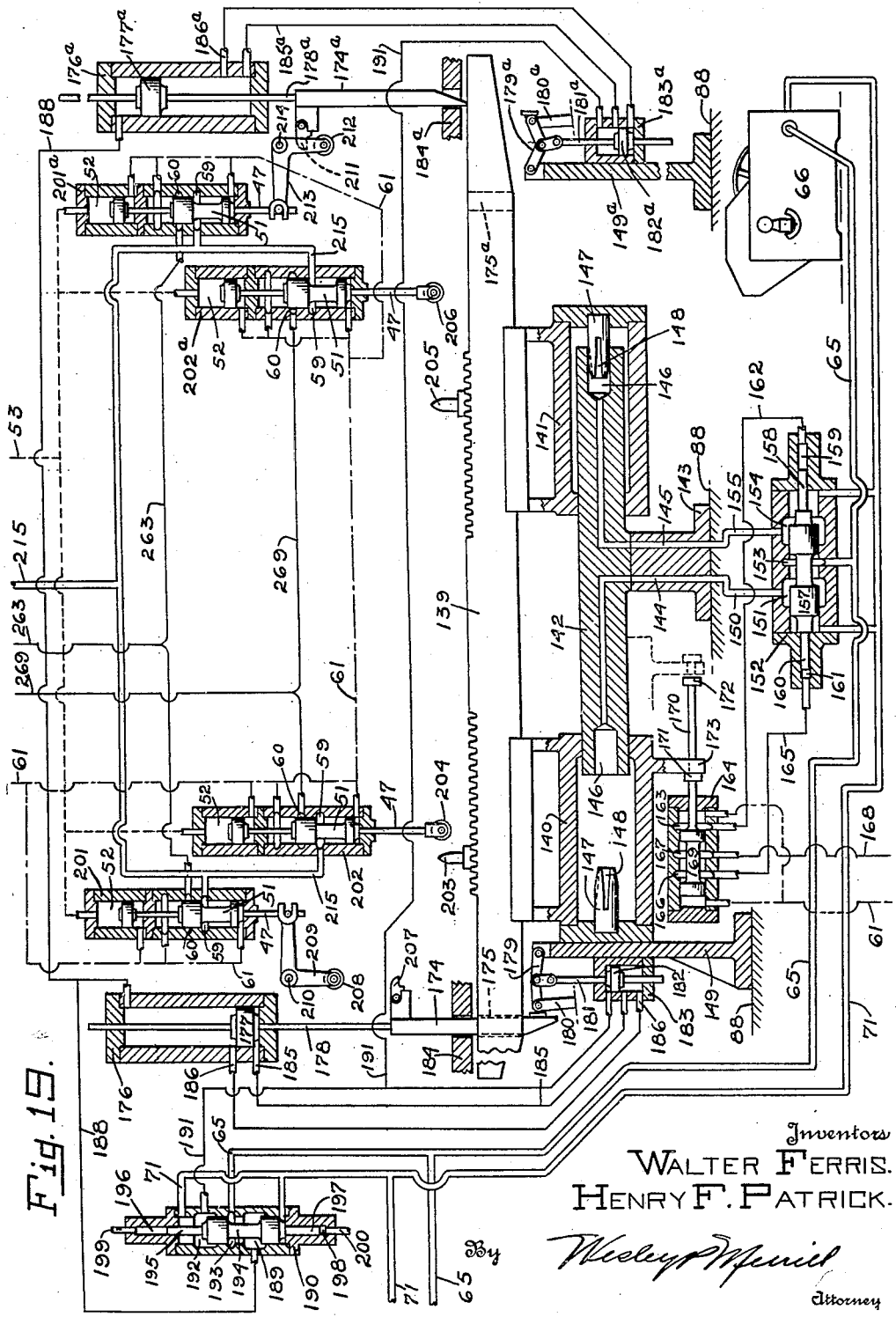

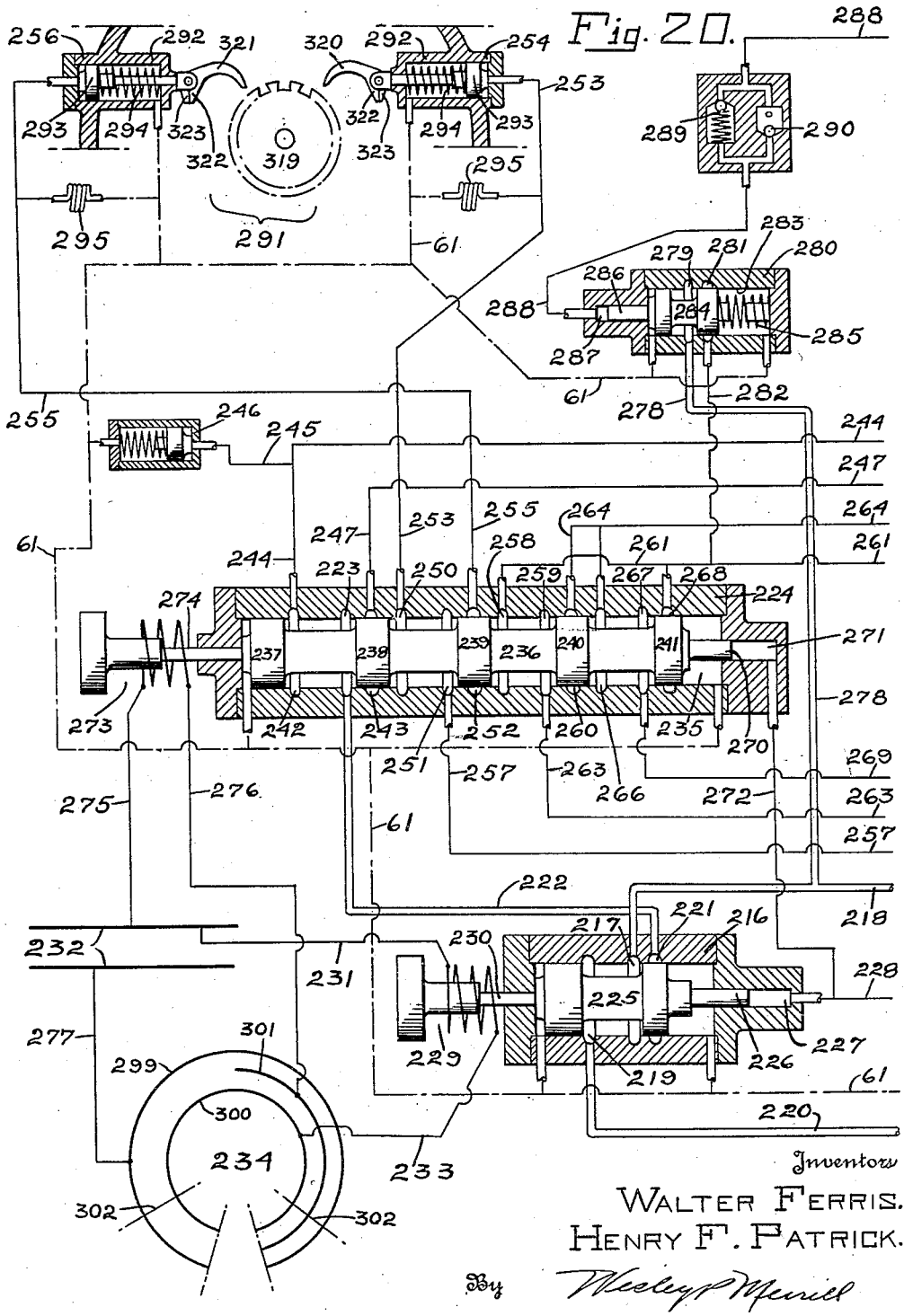

Patented Mar. 29, 1932

1,851,502

UNITED STATES PATENT OFFICE

WALTER FERRIS, OF MILWAUKEE, AND HENRY F. PATRICK, OF WAUKESHA, WISCONSIN, ASSIGNORS TO OILGEAR COMPANY, OF MILWAUKEE, WISCONSIN, A CORPORATION OF WISCONSIN

HYDRAULIC CONTROL

Application filed March 5, 1931. Serial No. 520,271.

This invention relates to the automatic control of hydraulic motors which operate in a predetermined relation to each other.

An object of the invention is to automatically control the operation of a number of hydraulic motors which produce a number of inter-related movements constituting a cycle of operation.

Another object is to automatically operate certain hydraulic motors simultaneously and other hydraulic motors in a predetermined sequence during a cycle of operation.

Another object is to provide an automatic control having a selector valve for determining the sequence and relation of the operation of a number of hydraulic motors.

Another object is to provide an apparatus for controlling a number of hydraulic motors to cause the same to produce a number of inter-related movements during each cycle of operation and to come to rest at the end of one cycle of operation or to complete a predetermined number of cycles of operation before coming to rest.

Another object is to provide mechanism for controlling elevating or storage apparatus having independent cages or storage compartments arranged in vertical tiers which are raised and lowered by hydraulic elevating mechanism, and the individual compartments are transferred from one tier to the other by hydraulic transfer mechanisms.

Other objects and advantages will appear hereinafter.

The invention is exemplified by the storage elevator shown in the accompanying drawings in which the views are as follows:

Fig. 6 is a front view of a rotary switch which controls the operation of the hydraulic operating mechanism and determines the number of cycles which the mechanisms will complete before coming to rest.

Fig. 7 is a section of the line 7—7 of Fig. 6.

Fig. 8 is a section, taken on the irregular line 8—8 of Fig. 7, showing the switch indexing mechanism.

Fig. 9 is a side elevation of a selector valve which determines the sequence of certain operations.

Fig. 10 is a schematic drawing of the selector valve and shows the cylindrical surface of its rotary valve member developed into a plane surface, the passageways within the valve member, and the passageways and ports in the valve casing.

Fig. 16 is a longitudinal section through the selector valve, taken on line 16—16 of Fig. 15 and showing diagrammatically the manner of connecting this valve into the hydraulic circuit.

Fig. 17 is a sectional plan view taken on line 17—17 of Fig. 16.

Fig. 19 is in part a schematic drawing showing the elevating mechanism connected into the hydraulic circuit and in part a detail view showing certain motors and valves in longitudinal section.

Fig. 20 is in part a detail view showing certain valves in longitudinal section and in part a schematic drawing showing the relation of these valves to the hydraulic circuit, and also showing the electric circuit of the rotary switch.

Figure 18:
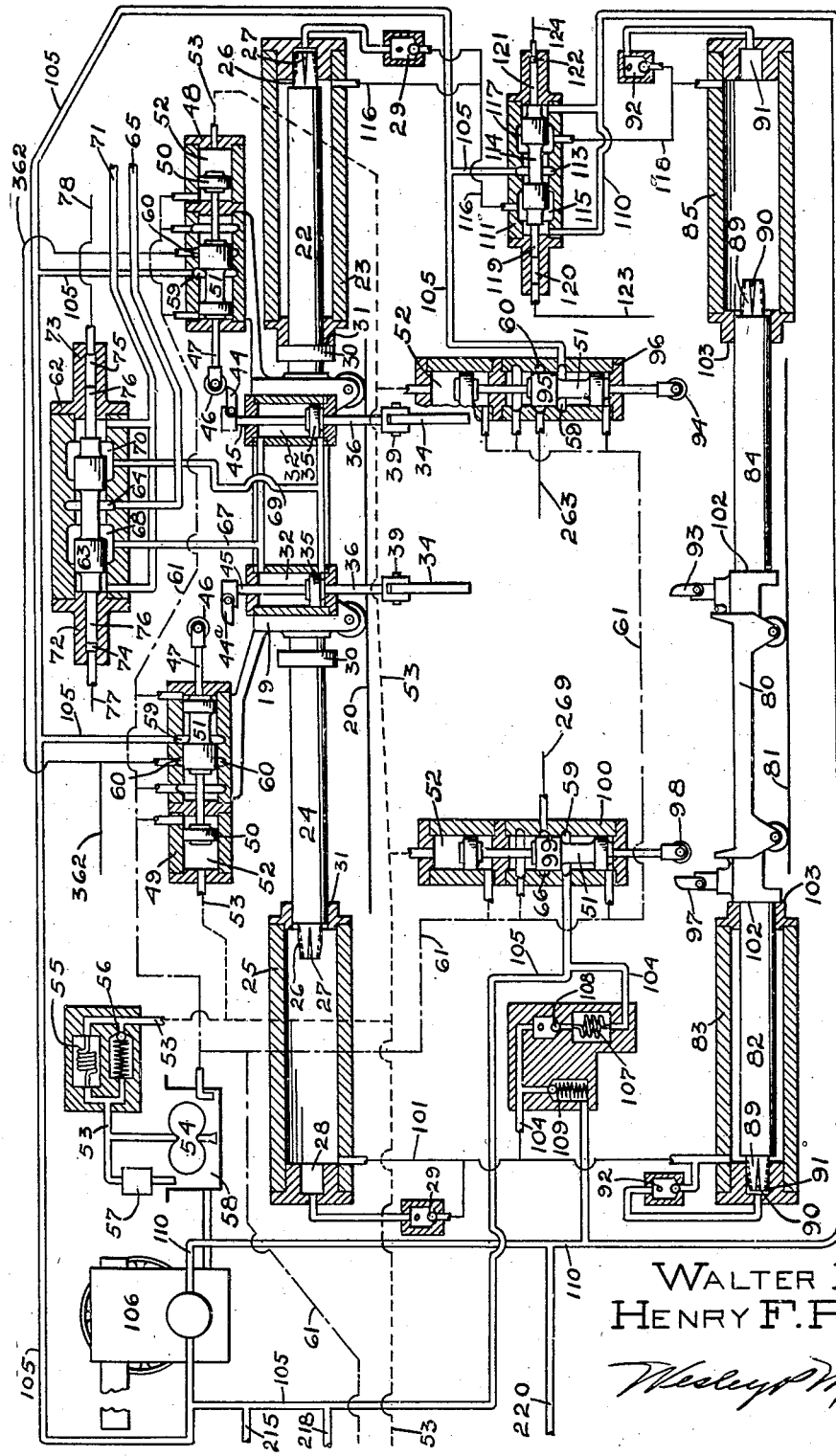
Fig. 18 is in part a schematic drawing showing the upper and lower transfer mechanisms connected into the hydraulic circuit and in part a detail view showing certain motors and valves in longitudinal section.

Figs. 18, 19 and 20 taken together constitute a diagram of the complete hydraulic circuit.

The elevator shown in the drawings was devised for the storage of automobiles and it has a number of separate storage compartments each of which is intended to receive a separate automobile. The compartments are arranged in two stacks or tiers and one compartment in each stack or tier normally has its floor in alinement with a loading platform or floor.

Either of the tiers may be raised and the other tier lowered by hydraulically operated elevating mechanism to bring the floor of a different compartment in each tier in alinement with the loading floor.

Each time that the tiers move vertically a distance substantially equal to the height of a compartment, the uppermost compartment in the ascending tier is transferred to the descending tier by upper transfer mechanism and the lowermost compartment in the descending tier is transferred to the ascending tier by lower transfer mechanism.

Raising one tier and lowering the other tier a distance substantially equal to the height of a compartment and transferring a compartment from each tier to the other tier constitutes a cycle of operation.

The elevator may be operated in either direction. When the tier of compartments at the right descends and the tier at the left ascends, the direction of operation is designated herein as clockwise and, when the tier at the right ascends and the tier at the left descends, the direction of operation is designated herein as counter-clockwise.

The transfer of the uppermost compartment in the ascending tier to the top of the descending tier and the transfer of the lowermost compartment in the descending tier to the lower end of the ascending tier is timed by the rotary selector valve as to sequence and direction in synchronized relation to the movement of the two tiers of cages.

The operation of the elevator as a whole is controlled by control mechanism which may be operated manually to cause the transfer and elevating mechanisms to complete one or any predetermined number of cycles of operation before coming to rest.

The elevator per se forms no part of the present invention which is directed to the control and synchronization of the movements created by the several hydraulic motors.

Elevator structure

The elevator is shown provided with twelve separate cages or storage compartments numbered from 1 to 12 inclusive and arranged in two stacks or tiers each of which normally contains an equal number of compartments.

The storage compartments are open at the front and rear ends thereof and are arranged for vertical movement in an elevator shaft which extends through a lower floor or loading platform 13, an upper floor or platform 14 and any intervening floors of the building in which the elevator is installed.

The storage compartments at the level of the loading floor 13 are supported by the elevating mechanism and each compartment thereabove rests firmly upon the compartment below it, the elevator shaft being provided to enclose a majority of the compartments and to prevent either tier from swaying when the same is being raised or lowered.

The elevator shaft has a central vertical partition 15 which separates the two tiers of compartments from each other, front and rear retaining plates 16 and 17 which close the front and rear ends of the majority of the compartments in both tiers, and four corner posts or guides 18 which extend through the lower floor 13.

The posts 18 are secured in fixed positions to the floors 13 and 14 and support the plates 16 and 17 and the partition 15, the plate 16 being secured to the front faces of the two front posts 18, the plate 17 being secured to the rear faces of the two rear posts 18, and the partition 15 being arranged between the plates 16 and 17 and secured thereto.

The partition 15 does not extend below the lower floor 13 nor above the bottom of the uppermost compartment in order to allow compartments to be transferred from one tier to the other at the upper and lower ends thereof.

The plates 16 and 17 extend from approximately the level of the floor 13 to a point above the bottom of the uppermost compartment and are cut away at their lower ends to expose the full area of the compartment at the level of the floor 13 in the tier at the right in order to receive and discharge automobiles at this point which is designated herein as the loading station.

The elevator may be provided with two or more loading stations but it has been shown provided with but one in order to simplify the description of the operation of the elevator.

The lowermost compartment in the tier at the left is shown supported upon the lower transfer mechanism in position to be transferred to the empty space at the bottom of the other tier and the uppermost compartment in the tier of the right is shown in position to be engaged by the upper transfer mechanism and transferred to the empty space at the top of the other tier.

If the elevator is to be operated in a counter-clockwise direction, these two compartments are transferred simultaneously from one tier to the other and then the elevating mechanism raises the tier at the right and lowers the tier at the left.

If the elevator is to be operated in a clockwise direction, the elevating mechanism raises the tier at the left and lowers the tier at the right and then the uppermost and the lowermost compartments are transferred to the other tiers by the upper and lower transfer mechanisms, respectively.

Upper transfer mechanism

The upper transfer mechanism has a carriage 19 arranged for reciprocation upon a track 20 which is supported at each end upon a base 21 carried by the floor 14.

The carriage 19 is moved toward the left by a hydraulic transfer motor which has its plunger 22 attached to the right end of the carriage 19 and its cylinder 23 secured upon one of the bases 21, and the carriage 19 is moved toward the right by another hydraulic transfer motor which has its plunger 24 attached to the left end of the carriage 19 and its cylinder 25 secured upon the other base 21.

The upper transfer motors are actuated by driving liquid which is delivered to and discharged from the outer ends of the cylinders 23 and 25 and its delivery is controlled by the same mechanism which controls two lower transfer motors. Consequently, the connection of the cylinders 23 and 25 into the hydraulic circuit and the delivery of liquid thereto will be described in connection with the description of the lower transfer mechanism.

The free ends of the plungers 22 and 24 are reduced in diameter to provide dashpot plungers 26 which have tapered grooves 27 formed longitudinally in peripheries thereof, and each of the cylinders 23 and 25 is provided at its outer end with a dashpot 28 which is connected through a check valve 29 to the pipe through which driving liquid is delivered to and discharged from the cylinder.

As the carriage 19 approaches the limit of its movement in either direction, one of the plungers 26 enters one of the dashpots 28 and, as the liquid in dashpot 28 cannot escape through the check valve 29, it must be ejected through the gradually diminishing orifices formed by the grooves 27 and the wall of the dashpot 28, thereby gradually and gently decelerating the carriage 19.

The exact point at which the carriage 19 comes to rest at each end of its stroke is determined by a stop collar 30, one of which is secured in adjusted position upon each of the plungers 22 and 24 to engage the end 31 of the cylinder 23 or 25.

The check valves 29 are connected between the dashpots 28 and the main supply pipe in order to allow the driving liquid to act upon the full cross-sectional area of the motor plunger in starting the carriage 19.

The carriage 19 has two hydraulic lifting motors 32 arranged diagonally opposite each other at two of its corners and two similar motors 33 arranged diagonally opposite each other at its other two corners.

Each of the motors 32 and 33 has a lifting hook 34 connected to its piston 35 by its piston rod 36 and adapted to engage a pin 37 one of which is secured in each upper corner of each compartment and arranged in a slot 38 through which the hook 34 extends when engaging the pin 37.

Liquid is delivered to all four of the motors 32 and 33 simultaneously to raise the pistons 35 and cause the hooks 34 to raise the uppermost compartment clear of the one beneath it, then one of the transfer motors is operated to move the carriage 19 until the stop collar 30 positively positions the moving compartment in vertical alinement with the other tier, and then the motors 32 and 33 are operated to lower the compartment upon the uppermost compartment in that tier and disengage the hooks 34 therefrom.

The lower ends of the piston rods 36 are bifurcated to receive the hooks 34 and are each provided with a pivot 39 upon which the hook 34 is journaled.

Each of the hooks 34 has a lever 40 secured to or formed integral therewith and bifurcated at its outer end to receive the crosshead of a rod 41 which is slidable through a bearing 42 carried by the lifting motor and having a spring detent 43 arranged therein and engaging the rod 41 to retard axial movement thereof.

When the piston rods 36 are raised, the frictional resistance of the detents 43 holds the rods 41 against axial movement until the levers 40 have swung the hooks 34 under the pins 37 and then the rods 41 slide through the bearings 42 and the hooks 34 lift the compartment.

When the piston rods 36 are lowered, the weight of the compartment draws the rods 41 through the bearings 42 against the frictional resistance of the detents 43 until the compartment rests upon the compartment beneath it, and then the detents 43 hold the rods 41 against further axial movement and the continued downward movement of the piston rods 36 causes the levers 40 to swing the hooks 34 clear of the pins 37 to allow the compartment to be lowered by the elevating mechanism.

One of the lifting motors 32 has a cam 44 pivoted upon the upper end of its tail rod 45 to engage, during the downward movement thereof, a roller 46 carried by the valve stem 47 of a trip valve 48, and the other lifting motor 32 has a cam 44ª pivoted to the upper end of its tail rod 45 to engage a roller 46 carried by the stem 47 of a trip valve 49.

The valves 48 and 49 are secured to the carriage 19 and are identical as to structure and function except that the valve 48 is operated by the cam 44 when a compartment is being lowered and the valve 49 is actuated by the cam 44ª when a compartment is being raised.

The valve 48 (Fig. 18) has a piston 50 which is connected by its piston rod to a plunger 51. The plunger 51 is secured to the rod 47 and, therefore, the roller 46 actuates the plunger 51 and the piston 50 simultaneously to control the movement of driving liquid through trip valve 48. The piston 50 is fitted in a cylinder 52 arranged upon the end of the valve 48 and connected at its outer end to a supply pipe 53 which is connected to a gear pump 54.

The pipe 53 has a choke coil 55 connected therein to restrict the rate of flow of liquid from the gear pump 54 to the cylinder 52, and a check valve 56 is connected in parallel with the choke 55 in order to allow the liquid to flow freely toward the gear pump 54 when the piston 50 is actuated toward the right by the roller 46. During this movement, the liquid in pipe 53, after passing through the check valve 56, is forced through a relief valve 57 and returned to the reservoir 58 of the gear pump 54.

After the cam 44 has actuated the piston 50 and has passed below the roller 46, the piston 50 and the plunger 51 are returned to their initial positions at a relatively slow rate by liquid delivered by the gear pump 54 through the choke 55.

The plunger 51 in the trip valve 48 controls an admission port 59 which is so arranged that, when the plunger 51 is in its normal retracted position, the port 59 is blocked and no fluid is allowed to pass through the valve 48. The plunger 51 also controls an exit port 60 which is so arranged that, when the plunger 51 has been actuated to its operating position by the cam 44, the exit port 60 is in communication with the admission port 59 and liquid may flow through the valve 48 to operate a selector valve 79 shown in Figs. 9 to 16. The valve 48 has each end of its cylinder and the forward end of the cylinder 52 connected to a drain pipe 61 which discharges into the sump 58 of the gear pump 54.

The trip valve 49 is substantially identical to the valve 48 and like parts thereof have been indicated by like reference numerals. The purpose of these valves is to operate the selector valve 79 at certain predetermined periods in each cycle of operation.

The delivery of driving liquid to all four of the lifting motors 32 and 33 is controlled by a hydraulically operated valve 62 (Fig. 18) having a plunger 63 for controlling communication between the lifting motors and its inlet port 64 which is connected by a supply pipe 65 to the outlet of a pump 66 (Fig. 19) of a well known construction.

The upper ends of all four lifting motors 32 and 33 are connected by a pipe 67 to a chamber 68 in the valve 62, the lower ends of all four motors 32 and 33 are connected by a pipe 69 to a chamber 70 in the valve 62, and both ends of the valve casing are connected by a return pipe 71 to the reservoir of the pump 66.

Figure 3:
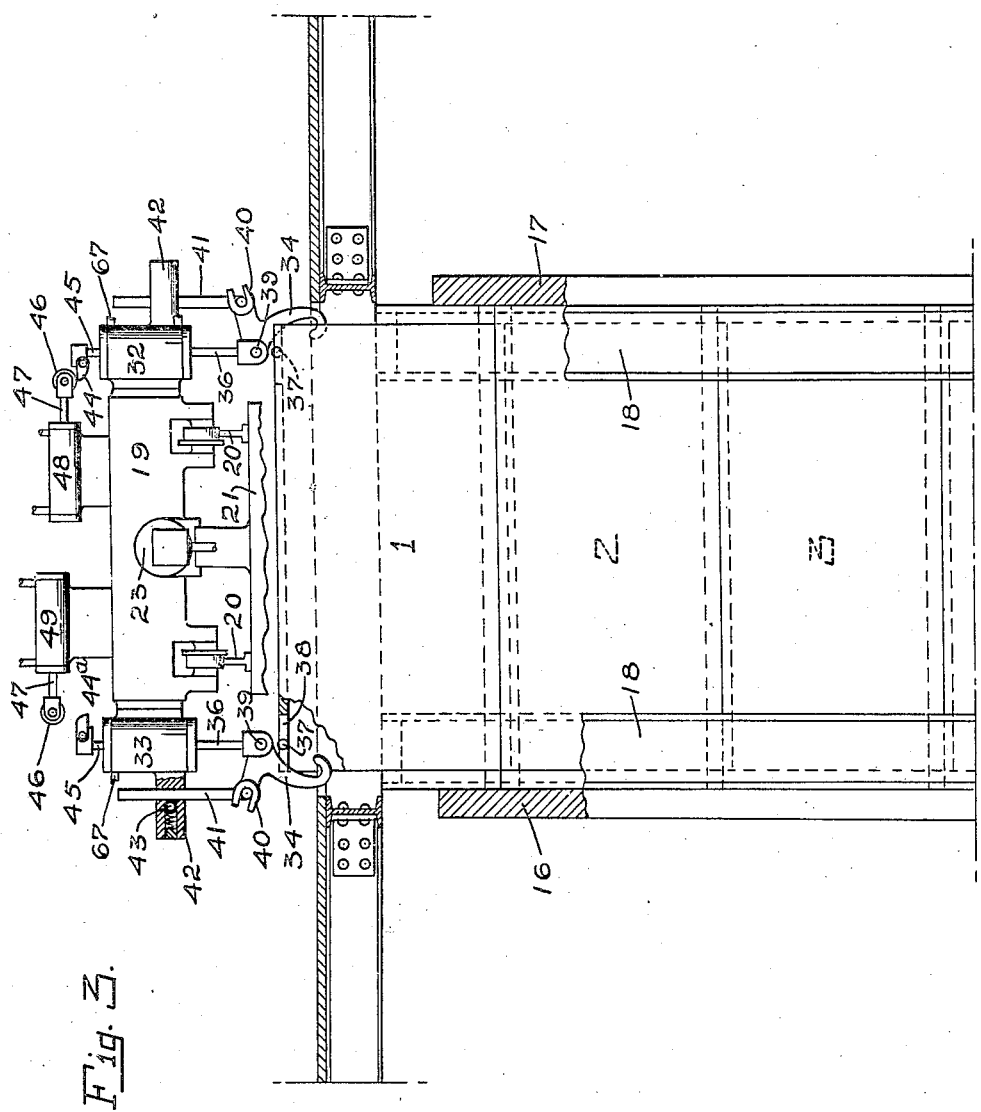
Fig. 3 is a side view taken on the line 3—3 of Fig. 2.

When the plunger 63 is in the position shown in Fig. 18, driving liquid from the supply pipe 65 is delivered to all four of the lifting motors 32 and 33 through the port 64, the chamber 68 and the pipe 67, and holds the pistons 35 therein in their lower positions and the hooks 34 out of engagement with the pins 37, as shown in Fig. 3. The lower ends of the lifting motors 32 and 33 are in communication at this time through the pipe 69 and the valve 62 with the return pipe 71.

The plunger 63 in the valve 62 is operated hydraulically by two motors 72 and 73 secured upon the ends of the casing of valve 62. The motors 72 and 73 contain, respectively, a bore 74 and a bore 75 to receive small plungers 76 one of which is secured upon each end of the plunger 63. The bore 74 of cylinder 72 is connected to one end of a pipe 77, the bore 75 of cylinder 73 is connected to one end of a pipe 78, and the pipes 77 and 78 have their other ends connected to the selector valve 79 as shown in Figs. 9 and 16. The plunger 63 in the valve 62 is normally held in the position shown in Fig. 18 by liquid trapped in the bore 75 and the pipe 78 by the selector valve 79.

When driving liquid is supplied to the pipe 77 and the pipe 78 is open to the drain, the plunger 63 in the valve 62 is forced to the right until it stalls against the end of the valve casing and closes the port 64 to the chamber 68 and opens it to the chamber 70. Driving liquid from the pipe 65, through the valve 62, the port 64, the chamber 70 and the pipe 69, then reaches the lower ends of all four lifting motors 32 and 33 and raises the hooks 34 to lift the uppermost compartment clear of the one beneath it. Fluid from the upper ends of motors 32 and 33 flows through the pipe 67, valve 62 and return pipe 71 to the reservoir of the pump 66.

Lower transfer mechanism

Figure 4:
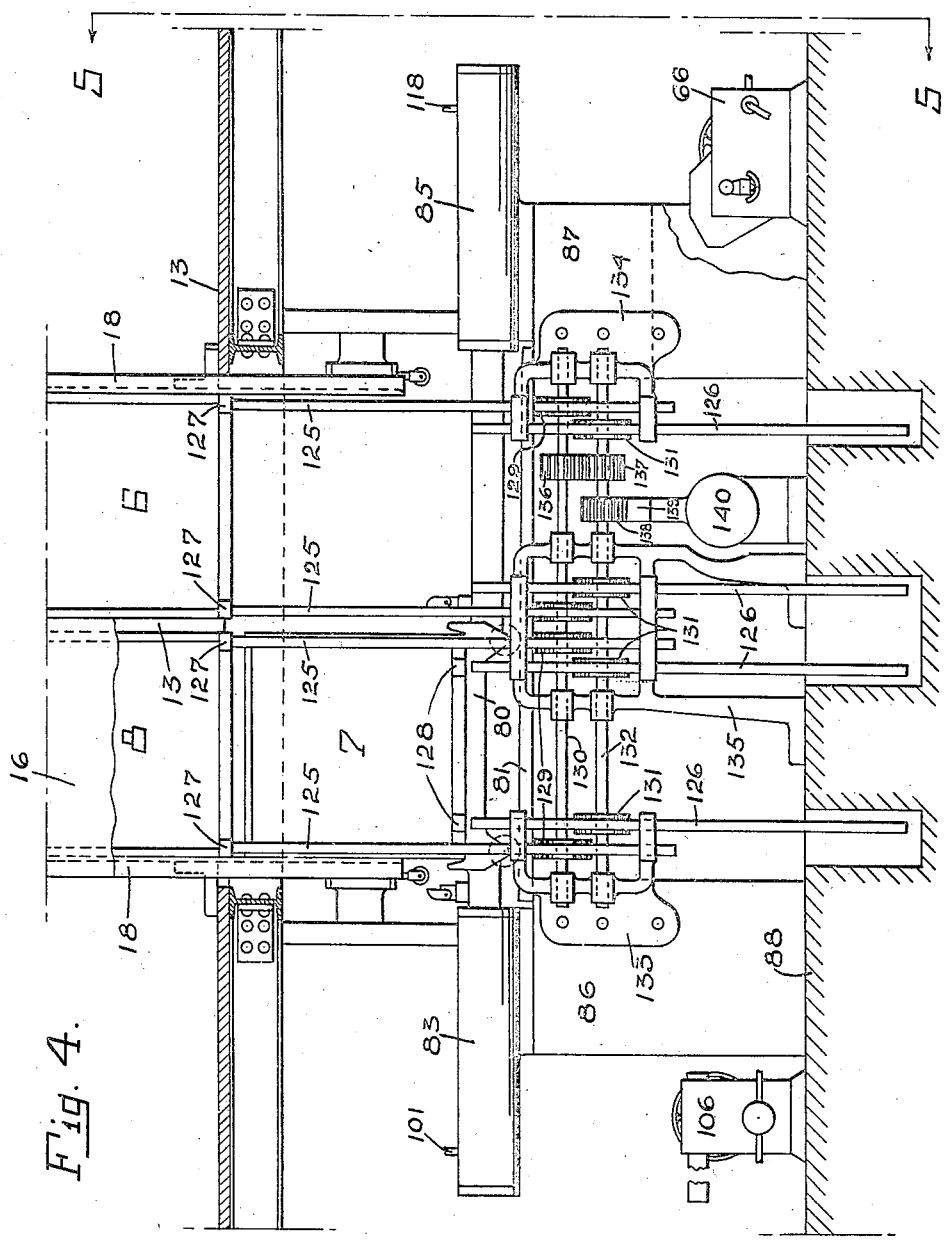
Fig. 4 is a front view of the lower part of the elevator showing the elevating mechanism which raises and lowers the tiers of compartments and the lower transfer mechanism which transfers compartments from one tier to the other.
Figure 5:
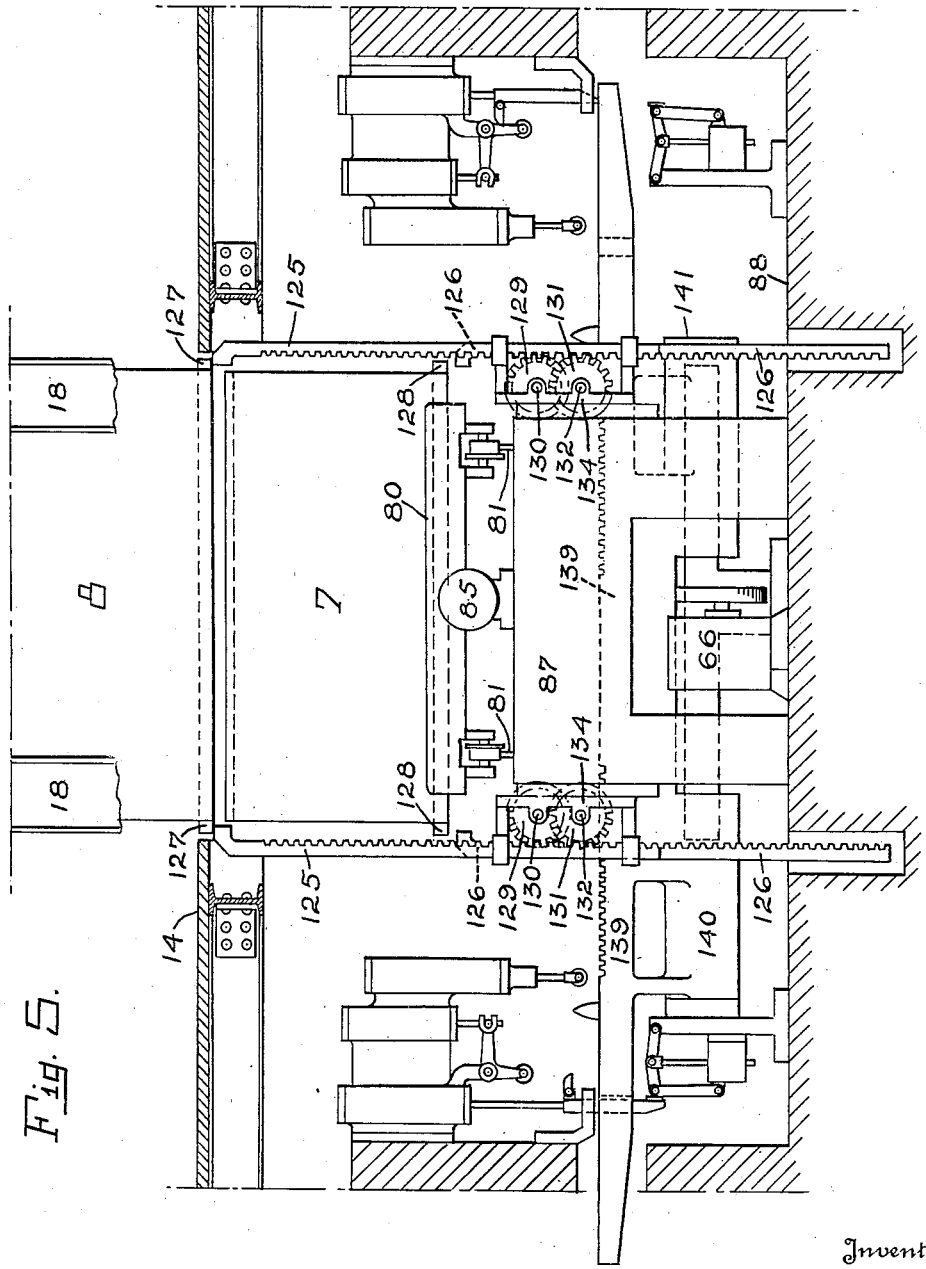
Fig. 5 is a side view of the elevating mechanism and the lower transfer mechanism, taken on the line 5—5 of Fig. 4.

The lower transfer mechanism (see Figs. 4, 5 and 18) has a carriage 80 arranged for reciprocation on a track 81 and actuated toward the right by a plunger 82, secured to one end thereof and reciprocating in a cylinder 83, and toward the left by a plunger 84 reciprocating in a cylinder 85. The cylinder 83 and one end of the track 81 are supported by a base 86, the cylinder 85 and the other end of the track 81 are supported by a base 87, and the bases 86 and 87 are supported upon a foundation 88.

The plungers 82 and 84 are each provided upon the outer ends thereof with a dashpot plunger 89 having tapered grooves 90 formed in its periphery, and the cylinders 83 and 85 are each provided at the outer ends thereof with a dashpot 91 which is connected at its outer end into the hydraulic circuit through a check valve 92. The dashpot plungers 89, dashpots 91 and check valves 92 coact to provide a cushioning effect at the end of the transverse movement of the carriage 80 in either direction, as previously described in connection with the dashpot plungers 26, dashpots 28 and check valves 29 of the upper transfer mechanism.

The carriage 80 has a cam 93 pivoted upon the right hand end thereof in position to engage a roller 94 which is carried by the plunger 95 of a trip valve 96, and another cam 97 is pivoted upon the left hand end of the carriage 80 in position to engage a roller 98 carried by the plunger 99 of a trip valve 100. The trip valves 96 and 100 are similar in all respects to the trip valve 48 and like parts have been indicated by like reference numerals.

When the carriage 80 moves to the right during the transfer of a compartment, the pivoted cam 93 raises the roller 94 and operates the valve 96 at or near the end of the carriage movement and, when the carriage 80 moves to the left, the pivoted cam 97 raises the roller 98 and operates the valve 100 at or near the end of the carriage movement. The valves 96 and 100 are operated at these predetermined periods in the cycle of operation in order to allow driving liquid to flow therethrough to operate the selector valve 79.

The upper transfer cylinder 25 is connected to the lower transfer cylinder 83 by a pipe 101 to which the dashpots 28 and 91 in those cylinders are connected, respectively, through the check valves 29 and 92. When hydraulic pressure in the cylinder 23 acting upon the plunger 22 moves the carriage 19 and the plunger 24 to the left, liquid is forced from the interior of the cylinder 25 through the pipe 101 into the interior of the cylinder 83 to thereby actuate the plunger 82, the carriage 80 and the plunger 84 toward the right. When driving liquid is supplied to the cylinder 85 and forces the plunger 84 and the carriage 80 toward the left, the liquid expelled from the cylinder 83 through the pipe 101 enters the cylinder 25 and forces the plunger 24 and the carriage 19 toward the right.

The movement of the lower transfer carriage 80 in either direction is limited by two stops 102 one of which is arranged upon each of its ends to abut against a stop 103 one of which is arranged upon the inner end of each of the cylinders 83 and 85.

In order to insure that each carriage will complete its stroke and abut its stop, the pipe 101 and the cylinders 25 and 83 are kept flooded by liquid supplied through a pipe 104 from a supply pipe 105 which is connected to the outlet of a pump 106 of well known construction.

The flow of liquid through the pipe 104 is controlled by a choke 107 and a check valve 108 which are connected in series therein to allow a restricted flow of liquid from the pipe 105 to the pipe 104 and to prevent a flow of liquid in the opposite direction, and the hydraulic pressure created in the pipe 101 and the cylinders 25 and 83 is limited by a resistance valve 109 which has its inlet connected to the pipe 104 between the check valve 108 and the pipe 101 and its outlet connected to the return pipe 110 of the pump 106.

The cylinders 25 and 83 are thus open at all times to the pressure created by the pump 106 but, when the elevator is idle, the plunger 24 is held against further outward movement by the stop collar 30 on the plunger 22 abutting the end 31 of the cylinder 23, and the plunger 82 is held against outward movement by the liquid in the cylinder 85 being trapped therein by a control valve 111 which controls the delivery of liquid to both of the cylinders 23 and 85 and the escape of liquid therefrom.

When the control valve 111 is operated to direct driving liquid to one of the transfer motors on the right side of the elevator and move one of the transfer carriages, the other transfer motor on the right side of the elevator is open to the return pipe 110 and a limited volume of liquid may flow into the pipe 101 from the supply pipe 105 through the choke 107.

The advancing carriage expels liquid from its transfer motor on the left side of the elevator, the expelled liquid enters the other transfer motor on the left side of the elevator and moves the other transfer carriage in the opposite direction, and the liquid in the inactive motor on the right side of the elevator is discharged into the return pipe 110.

Assuming that the transfer carriages are in the positions shown in Fig. 18 and that the valve 111 is operated to direct liquid into the cylinder 23, the carriage 19 will move to the left, the plunger 24 will expel liquid from the cylinder 25 through the pipe 101 into the cylinder 83 and advance the carriage 80, liquid will be expelled from the cylinder 85 into the return pipe 110, and liquid will flow from the supply pipe 105 through the pipe 104 and the choke 107 into the pipe 101 and the cylinder 83 and advance the carriage 80 faster than the carriage 19, thereby insuring that both carriages reach the limit of their movements and stall against their respective stops.

After the carriages have stalled and when the valve 111 is operated to return them to their initial positions, the liquid entering the cylinder 25 through the choke 107 will advance the carriage 19 faster than the carriage 80 and cause it to stall against its stop before the carriage 80 completes its movement.

At the end of both movements, the extra volume of liquid which entered the pipe 101 through the choke 107 to advance the first carriage ahead of the second will be expelled through the resistance valve 109 after the first carriage has completed its movement.

The control valve 111 has each of its ends connected to the return pipe 110 and a port 113 arranged intermediate its ends and connected to the supply pipe 105 which is also connected to the port 59 of each of the trip valves 48, 49, 96 and 100.

The flow of liquid through the valve 111 from the supply pipe 105 to the cylinders 23 and 85, and from the cylinders 23 and 85 to the return pipe 110, is controlled by a plunger 114 which controls communication between the port 113 and a chamber 115 which is connected by a pipe 116 to the outer end of the cylinder 23 and through the check valve 29 to the dashpot 28, and between the port 113 and a chamber 117 which is connected by a pipe 118 to the outer end of the cylinder 85 and through the check valve 92 to the dashpot 91.

The plunger 114 of the control valve 111 has a small plunger 119 secured upon its left end and fitted in a cylinder 120 arranged upon the left end of the valve casing, and a small plunger 121 secured upon its right end and fitted in a cylinder 122 arranged upon the right end of the valve casing.

The cylinder 120 is connected to the selector valve 79 by a pipe 123, the cylinder 122 is connected to the selector valve 79 by a pipe 124, and the plunger 114 is moved first to the left and then to the right by liquid delivered to the cylinders 122 and 120 through the selector valve 79 and the pipes 124 and 123.

When the elevator is idle, the plunger 114 is held to the right by liquid trapped in the cylinder 120 and the pipe 123 by the selector valve 79.

*Elevating mechanism*

The two tiers of compartments are raised and lowered by eight lifting racks 125 and eight lifting racks 126 which are arranged at the front and rear of the elevator shaft and are identical to each other but move in opposite directions, that is, when the racks 125 are raised, the racks 126 are lowered and vice versa.

One rack 125 is arranged at each corner of each tier of compartments and a rack 126 is arranged alongside each rack 125 and spaced a short distance therefrom toward the centerline of the tier.

The upper ends of the racks 125 are offset inwardly to engage projections 127 which are rigidly secured to the bottoms of alternate compartments at the corners thereof, and the upper ends of the racks 126 are offset to engage projections 128 which are rigidly secured to the bottoms of the other compartments and spaced from the corners thereof to aline with the racks 126 and to clear the racks 125 when these compartments are arranged at or near the lower end of either tier.

The eight racks 125 are raised and lowered by an equal number of gears 129, four of which are secured upon a front shaft 130 and mesh with the four racks 125 at the front of the elevator shaft and the other four gears 129 are secured upon a rear shaft 130 and mesh with the four racks 125 at the rear of the elevator shaft.

The eight racks 126 are raised and lowered by an equal number of gears 131, four of which are secured upon a front shaft 132 and mesh with the racks 126 at the front of the elevator shaft and the other four gears 131 are secured upon a rear shaft 132 and mesh with the four racks 126 at the rear of the elevator shaft.

The shafts 130 and 132 at the front of the elevator shaft are journaled in two end bearing brackets 133 and 134 and in a center bearing bracket 135, and the shafts 130 and 132 at the rear of the elevator are supported in similar bearing brackets.

The two bearing brackets 133 are secured to the front and rear sides of the base 86, the two bearing brackets 134 are secured upon the front and rear sides of the base 87, the bearing brackets 135 are supported upon the foundation 88, and all of the bearing brackets also function as guides for the racks 125 and 126 to hold them in mesh with the gears 129 and 131, respectively.

Each of the shafts 130 has a gear 136 secured thereon and in mesh with a gear 137 which has the same pitch diameter and is fixed upon the corresponding shaft 132. Consequently, rotation of the shaft 132 will cause the gears 129 and 131 to rotate in opposite directions and the racks 125 and 126 to be moved in opposite directions at the same speeds.

Each of the shafts 132 has a gear 138 fixed thereon and both of these gears 138 are driven by an operating rack 139 (Figs. 5 and 19) having two lifting cylinders 140 and 141 secured to the underside thereof and fitted upon opposite ends of a plunger 142 which is supported in a stationary position upon a thrust block 143 carried by the foundation 88, thereby supporting the cylinders 140 and 141 and the rack 139.

Liquid is delivered to and discharged from the cylinders 140 and 141, respectively, through two ducts 144 and 145 which extend through the thrust block 143 and the plunger 142.

The ducts 144 and 145 communicate with the lifting cylinders 140 and 141, respectively, through dashpots 146 one of which is formed in each end of the plunger 142 to receive a dashpot plunger 147 which is secured to the head of the corresponding cylinders and provided around its periphery with a number of tapered grooves 148.

When the lifting mechanism is idle, the dashpot plunger 147 in one of the lifting cylinders extends into its dashpot 146 and liquid directed into that cylinder must flow through the small ends of the grooves 148.

Consequently, the lifting cylinders and the operating rack are started slowly and gradually accelerated as the effective widths of the grooves 148 increase until the dashpot plunger 147 is fully withdrawn from its dashpot 146 and the rack 139 then moves at full speed until the dashpot plunger 147 in the other lifting cylinder enters the dashpot 146 in the other end of the plunger 142. Thereafter the escape of liquid from that cylinder is progressively restricted by the gradually diminishing effective areas of the grooves 148 as the plunger 147 moves into the dashpot 146, and the lifting cylinders and operating rack are gradually decelerated.

When the rack 139 reaches the limit of its movement in one direction, the cylinder 140 stalls against a support 149, and, when it reaches the limit of its movement in the opposite direction, it stalls against a support 149ª. The supports 149 and 149ª are alike and are secured in fixed positions upon the foundation 88.

The duct 144 is connected by a pipe 150 to a port 151 in a hydraulically operated control valve 152 which controls the delivery of liquid from the pump 66 to the cylinders 140 and 141 and has its inlet port 153 connected to the supply pipe 65, a port 154 connected to the duct 145 by a pipe 155 and the ends of its valve chamber connected to the return pipe 71.

The ports 151, 153 and 154 in the valve 152 are controlled by its plunger 157 which simultaneously opens one of the lifting cylinders to the supply pipe 65 and opens the other lifting cylinder to the return pipe 71.

The plunger 157 of the valve 152 has a small plunger 158 secured upon one of its ends and fitted in a cylinder 159, which closes the corresponding end of the valve chamber, and another small plunger 160 secured upon its other end and fitted in a cylinder 161 which closes the corresponding end of the valve chamber.

The cylinder 159 is connected by a pipe 162 to a port 163 in a reversing valve 164, and the cylinder 161 is connected by a pipe 165 to a port 166 in the reversing valve 164 which controls the operation of the valve 152.

Liquid for operating the valve 152 enters the reversing valve 164 through its inlet port 167 which is arranged between the ports 163 and 166 and is connected by a pipe 168 to the selector valve 79 which controls the delivery of liquid to the valve 164, and liquid is exhausted from the valve 164 into the drain pipe 61 which is connected to each end of the valve chamber.

The reversing valve 164 has its plunger 169 provided with a stem 170 having two stop collars 171 and 172 secured in predetermined positions thereon upon opposite sides of an operating arm 173 which is carried by the cylinder 140 and operates the valve 164 near the end of the movement of the rack 139 in either direction.

In Fig. 19, the cylinder 140 is shown open to the supply pipe 65, the liquid delivered by the pump 66 has forced the end of the cylinder 140 to the limit of its movement against the support 149, and the arm 173 has operated the plunger 169 to open the cylinder 161 to the pipe 168 and the cylinder 159 to the drain pipe 61.

At a predetermined point in each cycle of operation, the selector valve 79 is operated to direct liquid through the pipe 168, the valve 164 and the pipe 165 into the cylinder 161 to force the plunger 157 to the right and open the cylinder 140 to the return pipe 71 and open the cylinder 141 to the supply pipe 65, the liquid in the cylinder 159 being exhausted through the pipe 162 and the valve 164 to the drain pipe 61.

Liquid from the pump 66 may now flow through the valve 152 to the cylinder 141 and move it and the rack 139 and the cylinder 140 to the right until it stalls against the support 149ª.

As the rack 139 approaches the limit of its movement, the arm 173 engages the collar 172 and moves the plunger 169 of the reversing valve 164 to the right, the selector valve 79 having been operated in the meantime to shut off the supply of liquid to the pipe 168 so that the control valve 152 will not be operated until the selector valve 79 is again operated.

At another predetermined point in each cycle of operation, the selector valve 79 is again operated to direct liquid through the pipe 168, the valve 164 and the pipe 162 to the cylinder 159 and move the plunger 157 to the left and open the cylinder 140 to the supply pipe 65 and open the cylinder 141 to the return pipe 71, the liquid in the cylinder 161 being exhausted through the pipe 165 and the valve 164 to the drain pipe 61.

Liquid from the pump 66 may now flow through the valve 152 to the cylinder 140 and move it and the rack 139 and the cylinder 141 to the left until it stalls against the support 149 and the arm 173 will move the valve plunger 169 to the left, thereby completing a cycle of operation for this part of the elevator mechanism and returning the parts thereof to the positions shown in Fig. 19.

The rack 139 is positively locked when it reaches the limit of its movement in either direction, and the locking mechanism at the front of the elevator is the same as the locking mechanism at the rear thereof.

The locking mechanism at the front of the elevator has a key 174 for entering a keyway 175, which is formed in the front end of the rack 139, and a locking motor 176 which has its piston 177 connected by a rod 178 to the key 174 for moving it into and out of the keyway 175.

When the key 174 is in its operative position, as shown in Fig. 19, it extends through the keyway 175 and is engaged at its lower end by a toggle 179 which has the outer end of one of its arms pivoted to the support 149 and its other arm pivoted near its outer end to a link 180 which has its other end pivoted to a suitable support (not shown).

The toggle 179 has the inner ends of its arms pivoted to each other and to a rod 181 which is secured to the piston 182 of a toggle motor 183 carried by the support 149.

When the piston 182 is raised, the free end of the toggle is forced against the lower end of the key 174 and moves it outwardly against the side of the keyway 175 and thereby urges the rack 139 forwardly and holds the end of the cylinder 140 firmly against the support 149. The rack 139 is thus securely locked against movement in either direction and, as the connecting ends of the toggle arms move past dead center, the toggle motor 183 must be operated before the key 174 can be withdrawn to release the rack 139. After the key 174 has been withdrawn from the keyway 175, it is held against any substantial amount of lateral movement by a guide 184.

The locking motor 176 and the toggle motor 183 are operated in sequence and are hydraulically connected to each other by a pipe 185, which connects the bottom of the motor 176 to the center of the motor 183, and a pipe 186 which connects the bottom of the motor 183 to the motor 176 at a point just above the piston 177 when it is in its lowermost position.

The locking mechanism at the rear of the elevator is identical to that just described and the parts thereof have been indicated by the same reference numerals with the exponent "a" added.

The upper ends of the two locking motors 176 and 176ª are connected by a pipe 188 to a port 189 in a lock control valve 190, and the upper ends of the toggle motors 183 and 183ª are connected by a pipe 191 to a port 192 in the control valve 190 which also has an inlet port 193 arranged between the ports 189 and 192 and connected to the supply pipe 65.

The flow of liquid through the control valve 190 is controlled by its plunger 194 which is operated hydraulically and has a small plunger 195 secured to one of its ends and fitted in a cylinder 196 arranged upon that end of the valve chamber, and another small plunger 197 secured to its other end and fitted in a cylinder 198 arranged upon that end of the valve chamber.

The delivery of liquid to the cylinders 196 and 198 is controlled by the selector valve 79 (Fig. 16) which is connected to the end of the cylinder 196 by a pipe 199 and to the end of the cylinder 198 by a pipe 200.

The selector valve 79 is operated, at one point in the cycle of operation, to open the cylinder 198 to the drain pipe 61 and to direct pressure liquid into the cylinder 196 to move the plunger 194 in one direction and, at another point in the cycle of operation, to open the cylinder 196 to the drain pipe 61 and to direct pressure liquid into the cylinder 198 to move the plunger 194 in the opposite direction.

The points in each cycle of operation, at which the selector valve 79 is operated to direct liquid to the cylinders 196 and 198, are determined by the operation of two trip valves 201 and 201ª which are operated by the movement of the keys 174 and 174ª, respectively, and two other points in each cycle of operation at which the selector valve 79 is operated is determined by the operation of two strip valves 202 and 202ª which are operated by the movement of the rack 139.

The trip valves 201, 201ª, 202 and 202ª are the same as the trip valve 48 previously described and like parts have been indicated by like reference numerals.

The trip valve 202 is operated by a double faced cam 203, which is secured upon the rack 139 near the front end thereof to engage a roller 204 carried by the valve stem 47 of the valve 202, and the valve 202ª is operated by a double faced cam 205 which is secured upon the rack 139 near the rear end thereof to engage a roller 206 carried by the valve stem 47 of the valve 202ª.

The trip valve 201 is operated by a cam 207 pivoted upon the key 174 to engage a roller 208 carried by the vertical arm of a bell crank lever 209 which is journaled upon a stationary pivot 210 and has its other arm connected to the stem 47 of the valve 201.

As the key 174 approaches the limit of its upward movement, the cam 207 engages the roller 208 and swings the lever 209 and thereby operates the valve 201 but, when the key 174 moves downwardly, the cam 207 is swung upon its pivot by the roller 208 and the lever 209 remains stationary.

The trip valve 201ª is operated in exactly the same manner by a cam 211 pivoted upon the key 174ª to engage a roller 212 carried by the vertical arm of a bell crank lever 213 which is journaled upon a stationary pivot 214 and has its other arm connected to the stem 47 of the valve 201ª.

Each of the trip valves 201, 201ª, 202 and 202ª has its inlet port 59 connected by a pipe 215 and the supply pipe 105 to the pump 106 (Fig. 18), the outer end of its operating cylinder 52 connected by the supply pipe 53 to the gear pump 54, and the inner end of its operating cylinder and both ends of its valve chamber connected to the drain pipe 61.

*Bypass and direction valves*

A bypass valve 216 (Fig. 20) has an inlet port 217 which is connected by a pipe 218 and the supply pipe 105 to the pump 106 (Fig. 18), a port 219 which is connected by a pipe 220 and the return pipe 110 to the reservoir of the pump 106, and port 221 which is connected by a pipe 222 to a port 223 in a direction valve 224. Both ends of the valve 216 are connected to the drain pipe 61.

The ports 219, 217 and 221 in valve 216 are controlled by a plunger 225 fitted in the valve chamber. When the plunger 225 is at the left, as shown in Fig. 20, the driving liquid from the pump 106 is bypassed through pipe 105, pipe 218, valve 216, pipe 220 and the return pipe 110 back to the pump 106 and no pressure is maintained therein.

When, however, the plunger 225 is moved to the right, the port 219 is cut off from communication with the port 217 and the port 217 is opened to the port 221. Liquid under pressure from the pump 106 will then flow through the pipe 218, the port 217, the port 221 and the pipe 222 to the port 223 in the valve 224.

The plunger 225 of the valve 216 has a small plunger 226 secured to its right end and fitted in a cylinder 227 which is arranged upon the end of the valve chamber and has its outer end connected by a pipe 228 to the selector valve 79 so that, at a predetermined point in the cycle of operation, the selector valve 79 will direct driving liquid through the pipe 228 to force the plunger 225 to the left.

The left end of the plunger 225 is connected to the core of a solenoid 229 by a rod 230. The solenoid 229 has one end of its winding connected by a conductor 231 to one side of a power line 232 and its other end connected by a conductor 233 to a terminal of an electric control switch 234. Closing the control switch 234 causes the solenoid 229 to move the plunger 225 to the right and to hold it there until the switch 234 is opened.

The direction valve 224 has a valve chamber 235 in which a plunger 236 is fitted and provided with five heads or valves 237, 238, 239, 240 and 241 for controlling the flow of liquid therethrough, and both ends of the chamber 235 are connected to the drain pipe 61.

The heads 237 and 238 control communication between the port 223 and two ports 242 and 243. The port 242 is connected to the selector valve 79 by a pipe 244 which is connected intermediate its ends to a pipe 245 leading to a hydraulic accumulator 246, the purpose of which is to receive and store temporarily liquid which is discharged from the pipe 244 at a certain point in the cycle of operation, and the port 243 is connected by a pipe 247 to the selector valve 79.

The heads 238 and 239 control communication between a port 250, a port 251 and a port 252. The port 250 is connected by a pipe 253 to a motor 254 for indexing the switch 234 in one direction, the port 252 is connected by a pipe 255 to a motor 256 for indexing the switch 234 in the opposite direction, and the port 251 is connected by a pipe 257 to the selector valve 79.

The heads 239 and 240 control communication between a port 258, a port 259 and a port 260. The port 258 is connected by a pipe 261 to an indexing motor 262 (Fig. 15), which operates the selector valve 79, the port 259 is connected by a pipe 263 to the discharge ports 60 in the trip valve 96 (Fig. 18) and in the trip valves 201 and 201ª (Fig. 19), and the port 260 is connected by a pipe 264 to an indexing motor 265 (Fig. 15) which also operates the selector valve 79.

Figure 15:
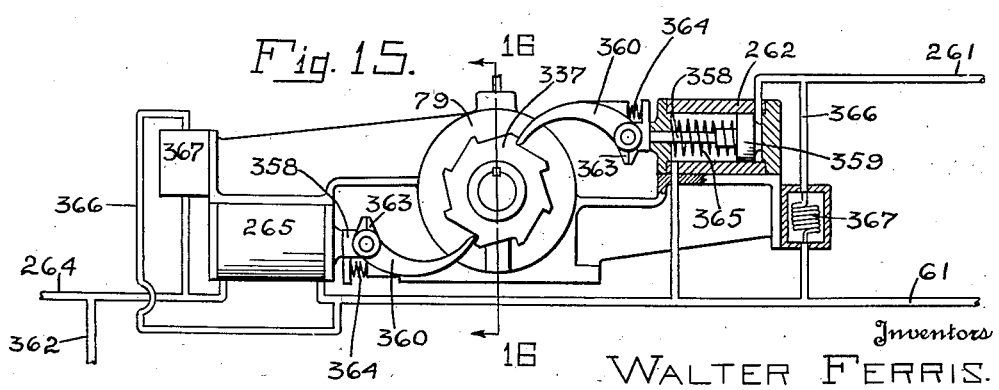
Fig. 15 is a view of the left end of the selector valve as shown in Fig. 9 and shows the valve indexing mechanism partly in section.

The heads 240 and 241 control communication between a port 266, a port 267 and a port 268. The port 266 is connected to the pipe 264 leading to the valve operating motor 265 (Fig. 15), the port 267 is connected by a pipe 269 to the discharge ports 60 of the trip valve 100 (Fig. 18) and of the trip valves 202 and 202ª (Fig. 19), and the port 268 is connected to the pipe 261 leading to the valve operating motor 262 (Fig. 15).

The plunger 236 of the valve 224 has a small plunger 270 secured to its right end and fitted in a cylinder 271 arranged upon the end of the valve chamber 235 and connected by a pipe 272 to the pipe 228 leading to the selector valve 79 so that, at a predetermined point in the cycle of operation, the introduction of driving liquid from the selector valve 79 through the pipes 228 and 272 into the cylinder 271 will force the plunger 236 to the left.

The left end of the plunger 236 is connected to the core of an electric solenoid 273 by a rod 274. The winding of the solenoid 273 has one of its ends connected to one side of the power line 232 by a conductor 275 and its other end connected by a conductor 276 to another terminal of the electric switch 234, and a third terminal of the switch 234 is connected by a conductor 277 to the other side of the power line 232. Closing the electric switch 234 causes the solenoid 273 to move the plunger 236 to the right and to hold it there until the switch 234 is opened.

The pipe 218, which connects the bypass valve 216 (Fig. 20) to the supply pipe 105, is connected intermediate its ends by a pipe 278 to a port 279 in a valve 280, a port 281 in the valve 280 is connected by a pipe 282 to the pipe 261, and both ends of the valve chamber 283 of the valve 280 are connected to the drain pipe 61.

The plunger 284 of the valve 280 controls the ports 279 and 281 so that, when the plunger 284 is moved to the right, the ports 279 and 281 are opened to each other and the pump 106 may deliver liquid through the pipes 105, 218 and 278, the valve 280, the pipe 282 and the pipe 261 to the valve operating motor 262. (Fig. 15.)

The plunger 284 is urged to the left, to normally close communication between the ports 279 and 281, by a helical compression spring 285 which is arranged within the chamber 283 of the valve 280 and abuts the right end of the plunger 284.

The plunger 284 has a small plunger 286 secured to its left end and fitted in a cylinder 287 which is connected by a pipe 288 to the selector valve 79 so that, at a predetermined period in the cycle of operation, the introduction of driving liquid from the selector valve 79 into the pipe 288 will force the plunger 284 toward the right against the resistance of the spring 285 and open the port 279 to the port 281.

The pipe 288 has a resistance valve 289 and a check valve 290 connected in parallel therein to allow liquid to flow freely from the cylinder 287 and to prevent the delivery of liquid to the cylinder 287 until the pressure in the pipe 288 becomes sufficient to overcome the resistance of the valve 289.

The switch indexing motors 254 and 256 (Fig. 20) form parts of an indexing mechanism 291 which rotates the switch 234 intermittently in either direction at predetermined points in the cycle of operation. The indexing motors 254 and 256 are identical except as to direction of operation and like parts thereof have been indicated by like reference numerals.

Each of the motors 254 and 256 has a cylinder 292 containing a piston 293 which is urged against the outer end of the cylinder by a helical compression spring 294. At predetermined points in the cycle of operation, the pistons 293 are forced inwardly against the action of the springs 294 by liquid delivered to the cylinders 292 through the pipes 253 and 255.

The inner ends of the cylinders 292 are connected to the drain pipe 61, and each of the pipes 253 and 255 is connected to the drain pipe 61 through a choke coil 295 which allows a limited quantity of liquid to pass therethrough so that, after one of the pistons 293 has been advanced by liquid delivered through one of the pipes 253 or 255 and communication has been then closed between that pipe and its source of pressure, the spring 294 will force the piston 293 to its retracted position and expel the liquid from the interior of the cylinder through the pipe 253 or 255 and through the choke coil 295 into the drain pipe 61.

*Rotary electric switch*

The rotary electric switch 234, shown in Figs. 6, 7 and 8, has a cylindrical casing 296 and, upon the front wall 297 thereof, is secured an annular insulator 298. The insulator 298 has embedded therein an outer stationary contact 299 which is substantially circular and connected by the conductor 277 to the power line 232 (Fig. 20), an inner stationary contact 300 which is substantially circular and connected by the conductor 233 to the winding of the solenoid 229 (Fig. 20), and an intermediate stationary contact 301 which is substantially semi-circular and connected by the conductor 276 to the winding of the solenoid 273 (Fig. 20).

The circuit through the switch 234 may be closed by moving any one of a number of movable contacts 302 into engagement with the stationary contacts.

Each contact 302 is secured to an insulator 303 which is attached by a pin 304 to a radial arm 305, and it is held against rotation about the axis of the pin 304 by a pin 306 which is secured to the insulator 303 and extends through the arm 305. A spring 307 is arranged between each insulator and its arm 305 and urges the contact 302 toward the stationary contacts to the limit allowed by the pin 304.

As many arms 305 are provided as there are storage compartments and each arm is provided with a suitable push button 308 which is numbered to correspond to a certain compartment. That is, the buttons 308 are numbered from 1 to 12 to correspond to the compartments numbered 1 to 12 respectively.

Each arm 305 is pivoted near its inner end to a circular rotatable head 309 by a pin 310 which is supported at its ends by two bosses 311 carried by the head 309 and arranged upon each side of the arm 305 to hold it against lateral movement.

The inner end of each arm 305 overlaps the head 309 and limits the forward movement of the free end of the arm 305 which is urged forwardly by a helical compression spring 312 arranged between the inner face of the arm 305 and a flange of the head 309.

When pressure is exerted upon one of the buttons 308, the free end of its arm moves toward the stationary contacts against the resistance of the spring 312, then the movable contact engages the stationary contacts, and then the spring 307 is compressed until a spring hook 313 carried by the arm 305 snaps under an annular flange 314 which extends around the front edge of the casing 296 through substantially the same angular distance as the stationary contacts 299 and 300.

The head 309 is rotated in either direction by a shaft 315 which is journaled in the front wall 297 and in the back plate 316 of the casing 296 and has its front end secured to the head 309 and its rear end connected to the switch indexing mechanism 291.

When one of the buttons 308 on the left side of the switch 234 is depressed until the hook 313 engages the flange 314 and holds the contact 302 against the circular contacts 299 and 300, the solenoid 229 is energized and moves the plunger 225 of the bypass valve 216 to the right (Fig. 20) and the switch indexing mechanism indexes the head 309 to the left or in counter-clockwise direction.

The switch 234 is held closed and the solenoid 229 continues holding the plunger 225 to the right until the indexing mechanism 291 has rotated the head 309 and moved the hook 313 of the depressed arm 305 along the annular flange 314 and past the end 317 thereof to enable the spring 312 to raise the arm, thus breaking the circuit and de-energizing the solenoid 229.

When one of the buttons 308 on the right side of the switch 234 is depressed until the hook 313 engages the flange 314 and holds the contact 302 against the stationary contacts 299, 300 and 301, the solenoid 229 is energized and moves the valve plunger 225 to the right, as previously described, the solenoid 273 is also energized and moves the plunger 236 of the direction valve 224 to the right, and the switch indexing mechanism 291 indexes the head 309 to the right or in a clockwise direction.

The switch 234 is held closed and the solenoids 229 and 273 (Fig. 20) continue holding the valve plungers 225 and 236, respectively, to the right until the indexing mechanism 291 has rotated the head 309 and moved the hook 313 of the depressed arm 305 along the annular flange 314 and past the end 318 thereof to enable the spring 312 to raise the arm, thus breaking the circuit and deenergizing both the solenoids 229 and 273.

The switch indexing mechanism 291 has a toothed indexing wheel 319 which is keyed upon the rear end of the shaft 315 and indexed in one direction by a pawl 320 carried by the indexing motor 254 and in the opposite direction by a pawl 321 carried by the indexing motor 256.

The pawls 320 and 321 are pivoted to the piston rods of the motors 254 and 256, respectively, and each is free to swing upwardly to clear the teeth of the wheel 319 but is held against dropping below its normal path of travel by a shoulder 322 which is formed on the pawl and abuts a stop 323 carried by the piston end of the indexing motor.

When liquid is delivered through the pipe 253 to the motor 254, the pawl 320 engages a tooth of the wheel 319 and indexes the switch 234 in a counter-clockwise direction one step or space corresponding to the spacing of the teeth on the wheel 319 and, when liquid is delivered through the pipe 255 to the motor 256, the switch 234 is indexed one step in a clockwise direction.

In order to prevent the tooth wheel 319 from overrunning and to hold it stationary when the pawls 320 and 321 are retracted, it is locked in position by a detent 324 which fits between adjacent teeth of the wheel 319 and has its stem 325 arranged in a guide bearing 326 carried by the back plate 316 in radial alinement with the wheel 319.

The detent 324 is urged into engagement with the wheel 319 by a helical compression spring 327 arranged between the bearing 326 and two arms 328 which extend laterally from the stem 325, and it is moved out of engagement with the wheel 319 by either of two bevel faced cams 329 one of which is carried by the piston rod of each of the indexing motors and engages the beveled end of an arm 328 and raises the detent 324 clear of the wheel 319 before the pawl 320 or 321 engages the same.

*Selector valve*

The sequence of the several operations previously described are controlled by the selector valve 79 shown in Figs. 9 to 17.

The selector valve is controlled by the eight trip valves 48, 49, 96, 100, 201, 201$^a$, 202 and 202$^a$ which are operated by certain moving parts, as previously described, and cause the selector valve to be rotatively indexed step by step to distribute the liquid to the various valves and motors in the proper sequence.

During each step in the indexing of the selector valve, certain functions are performed and, when the selector valve has made a complete revolution, a cycle of operation has been completed.

The distribution of liquid to the various valves and motors may be controlled by either a single valve or by two separate valves but, for the purpose of illustration and for manufacturing reasons, the selector valve 79 is shown divided into two parts or halves each of which constitutes a complete valve. The left half or part controls the distribution of liquid when the elevator is operated in a clockwise direction and the right half or part controls the distribution of liquid when the elevator is operated in a counter-clockwise direction. The two halves or parts of the selector valve are substantially alike.

The left half or part of the selector valve 79 has a casing 330 and the right half or part has a casing 331 which are joined end to end and have the valve chambers therein separated by a partition 332.

The casing 331 has a rotary valve member 333 fitted therein and provided upon its left end with a stem or shaft 334 which is fitted for rotation in the partition 332 and has its end squared and fitted in a complementary recess formed in the right end of a rotary valve member 335 fitted in the casing 330.

The valve member 335 has a shaft 336 secured to its left end and journaled in the head of the casing 330, and a ratchet wheel 337 is secured upon the outer end of the shaft 336 for rotatively indexing the valve members 333 and 335.

The casing 330 has a port 338 near its left end for the admission of liquid from the pipe 247 which is connected thereto, a port 339 near its right end for the discharge of liquid into the drain pipe 61 which is connected thereto, and nine distributing ports 340 arranged in alinement between the admission port 338 and the discharge port 339. The ports 340 are closed by plugs 341 to which the various distributing pipes are connected.

The casing 331 is substantially the same as the casing 330 and has a port 342 near its left end for the admission of liquid from the pipe 244 which is connected thereto, a port 343 near its right end for the discharge of liquid into the drain pipe 61 which is connected thereto, and nine distributing ports 340 arranged between the admission port 342 and the discharge port 343 and closed by plugs 341 to which the various distributing pipes are connected. The ports in the casing 331 are arranged in alinement with each other and with the ports in the casing 330.

The corresponding ports 340 in the valve casings 330 and 331 are connected to the same distributing pipes. The first port 340 from the left end of each casing is connected to the pipe 288, the second port 340 in each casing is connected to the pipe 200, the third port in each casing is connected to the pipe 199, the fourth port 340 in each casing is connected to the pipe 228, the fifth port 340 in each casing is connected to the pipe 257, the sixth port 340 in each casing is connected to the pipe 77, the seventh port 340 in each casing is connected to the pipe 78, the eighth port 340 in each casing is connected to the pipe 124 and the ninth port in each casing is connected to the pipe 123.

Each of the distributing ports 340 has a large bore 344, which is sunk part way through the wall of the valve casing from the outside thereof, and two small bores 345 which are spaced from each other and extend from the large bore 344 to the inside of the valve casing, as shown in Figs. 16 and 17.

The plug 341 has an opening through its center for the passage of liquid to or from the distributing pipe to which it is connected, and its inner end is spaced from the bottom of the bore 344 so that liquid may flow from the connecting pipe into the valve casing through either of the bores 345 one of which is always closed by the rotary valve members 333 or 335.

At a certain point in each cycle of operation, one of the bores 345 will communicate with a duct in the rotary valve member and, at another point in the cycle of operation, the other bore 345 will communicate with another duct in the rotary valve member.

Figure 11:
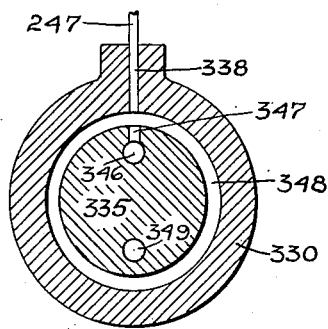
Fig. 11 is a transverse section through the selector valve, taken on the line 11—11 of Fig. 16 and showing the rotary valve member in one characteristic position.

The rotary valve member 335 has a delivery passageway 346 arranged longitudinally therein and connected by a duct 347 to an annular channel 348 which is formed in the periphery of the valve member 335 and communicates at all times with the admission port 338, as shown in Figs. 11 and 16. The passageway 346 receives driving liquid from the pipe 247 and distributes it to the various distributing pipes as the valve member 335 is rotatively indexed.

The valve member 335 also has a discharge passageway 349 formed longitudinally therein and connected by a duct 350 to an annular channel 351 which is formed in the periphery of the valve member 335 and communicates at all times with the discharge port 339. The passageway 349 receives discharge liquid from the various distributing pipes and delivers it to the drain pipe 61 through the duct 350 and channel 351.

The rotary valve member 333 is substantially the same as the valve member 335 and has a delivery passageway 352 arranged longitudinally therein and connected by a duct 353 to an annular channel 354 which is formed in the periphery of the valve member 333 and communicates at all times with the admission port 342. The passageway 352 receives liquid from the pipe 244 and distributes it to the various distributing pipes as the valve member 333 is rotatively indexed.

The valve member 333 also has a discharge passageway 355 formed longitudinally therein and connected by a duct 356 to an annular channel 357 which is formed in the periphery of the valve member 333 and communicates at all times with the discharge port 343. The passageway 355 receives discharge liquid from the various distributing pipes and delivers it to the drain pipe 61 through the duct 356 and port 343.

The rotary valve members 333 and 335 are rotatively indexed by the indexing motors 262 and 265 which are identical to each other and operate alternately to rotate the ratchet wheel 337.

Each of the motors 262 and 265 has the rod 358 of its piston 359 provided at its outer end with a pawl 360 which is pivoted thereto and engages a tooth of the ratchet wheel 337 when the piston 359 is advanced, thereby rotating the ratchet wheel 337 and the valve members 333 and 335 one step or space each time that driving liquid is supplied to the motor 262 through the pipe 261 or to the motor 265 through the pipe 264, and the valve members 333 and 335 are prevented from overrunning by a spring detent 361 which is arranged in the head of the casing 330 and engages suitable indentations formed in the shaft 336.

The delivery of liquid to the motors 262 and 265 is controlled by the direction valve 224 (Fig. 20), as previously described, and liquid is also delivered to the motor 265 through the trip valves 48 and 49 (Fig. 18) which have their ports 60 connected by a pipe 362 to the pipe 264.

Each of the pawls 360 is held in its normal position by a shoulder 363, which is formed thereon upon the side of the pawl pivot toward the horizontal centerline of the selector valve, and each pawl is urged against the end of the piston rod 358 by a helical compression spring 364 which is arranged upon the other side of the pawl pivot between the end of the pawl and a shoulder on the piston rod.

The spring 364 holds the free end of the pawl 360 against the ratchet wheel 337 and allows it to rise as it is advanced to rotate the ratchet wheel 337 and to ride over the next tooth on the ratchet wheel 337 when it is retracted.

Each pawl 360 and the piston 359 to which it is connected is retracted by a helical compression spring 365 which is arranged within the indexing motor between its gland end and the piston 359.

After the pistons 359 have been advanced by liquid delivered through the pipes 261 and 264 and the delivery of liquid through these pipes has been discontinued, the springs 365 retract the pistons 359 and force the liquid out of the motors 262 and 265 and through pipes 366 and chokes 367 into the drain pipe 61, a pipe 366 and a choke 367 being connected between the drain pipe 61 and each of the pipes 261 and 264.

The chokes 367 are of such capacity that only a relatively small quantity of liquid escapes therethrough when the pistons 359 are being advanced but are of sufficient capacity to allow the liquid contained in the motors to escape during the interval that each motor is inoperative.

Each time that liquid is delivered to an indexing motor, the valve members 333 and 335 are rotated a distance equal to the angular distance between adjacent teeth on the ratchet wheel 337, or one-eighth of a revolution, and certain ducts in the valve members 333 and 335 are brought into registry with certain of the distributing pipes to cause certain operations to be performed. The other indexing motor is then operated to index the valve members 333 and 335 another step or one-eighth of a revolution and cause certain ducts therein to register with certain of the distributing pipes to cause other operations to be performed. Sufficient time is thus provided for the liquid in each motor to be expelled through the choke 367 after the motor connected thereto ceases to function.

Liquid is delivered from the delivery passageways 346 and 352 to the various distributing pipes and liquid is returned from the distributing pipes to the discharge passageways 349 and 355 at predetermined points in each cycle of operation through a number of ducts which extend from the delivery and discharge passageways to the peripheries of the valve members and terminate in lines or stations spaced 45° apart and corresponding to the teeth of the ratchet wheel 337. That is, the outer ends of certain ducts register with certain of the ports 340 each time that one of the pawls 360 indexes the valve members 333 and 335 one step or eighth revolution.

Figure 13:
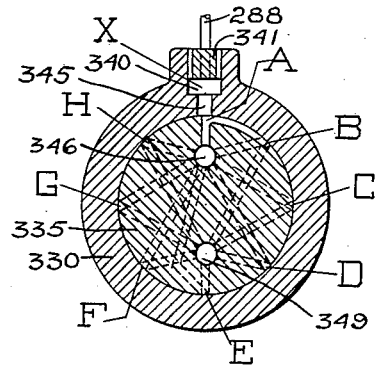
Fig. 13 is a transverse section through the selector valve, taken on the line 13—13 of Fig. 16 and showing the rotary valve member in the same position as in Fig. 11.
Figure 12:
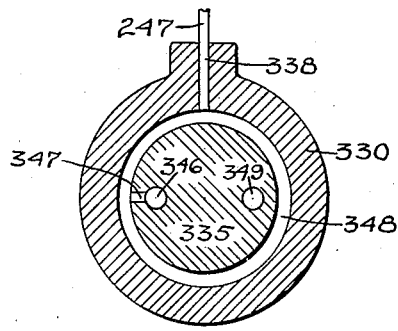
Fig. 12 is a view similar to Fig. 11 but showing the rotary valve member in a different characteristic position.
Figure 14:
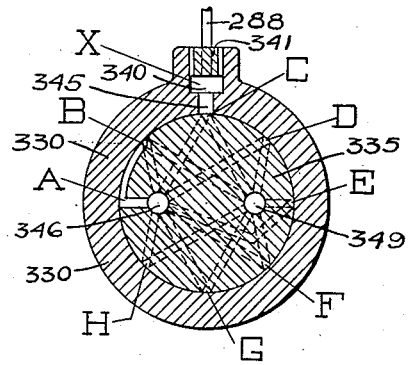
Fig. 14 is a view similar to Fig. 13 but showing the rotary valve member in the same position as in Fig. 12.

For the purpose of illustration, these lines or stations have been designated as stations A, B, C, D, E, F, G, and H and the line of ports in the valve casings 330 and 331 has been designated as station X, as shown in Figs. 10, 13 and 14.

Some of the ports 340 at station X are always in registry with some of the ducts when the valve members 333 and 335 are at rest and, at the end of each cycle of operation, certain of the ports 340 are in registry with the ducts at station A.

As best shown in Fig. 10, the valve member 335 has two delivery ducts 368 and 369 leading from its periphery at station A to the passageway 346, a delivery duct 370 and a discharge duct 371 leading from its periphery at station B to the delivery passageway 346 and the discharge passageway 349, respectively, a discharge duct 372 and a delivery duct 373 leading from its periphery at station C to the discharge passageway 349 and the delivery passageway 346, respectively, a delivery duct 374 and a discharge duct 375 leading from its periphery at station D to the delivery passageway 346 and the discharge passageway 349 respectively, a discharge duct 376 and a delivery duct 377 leading from its periphery at station E to the discharge passageway 349 and the delivery passageway 346 respectively, a delivery duct 378 and a discharge duct 379 leading from its periphery at station F to the delivery passageway 346 and the discharge passageway 349, respectively, a discharge duct 380 and a delivery duct 381 leading from its periphery at station G to the discharge passageway 349 and the delivery passageway 346, respectively, and a discharge duct 382 and a delivery duct 383 leading from its periphery at station H to the discharge passageway 349 and the delivery passageway 346 respectively.

The valve member 333 has two delivery ducts 384 and 385 leading from its periphery at station A to the delivery passageway 352, a discharge duct 386 and a delivery duct 387 leading from its periphery at station B to the discharge passageway 355 and the delivery passageway 352, respectively, a discharge duct 388 and a delivery duct 389 leading from its periphery at station C to the passageways 355 and 352, respectively, also a discharge duct 390 leading from its periphery at station C to the discharge passageway 355, a delivery duct 391 and a discharge duct 392 leading from its periphery at station D to the passageways 352 and 355 respectively, a discharge duct 393 and a delivery duct 394 leading from its periphery at station E to the passageways 355 and 352, respectively, a delivery duct 395 leading from its periphery at station F to the passageway 352, a discharge duct 396 and a delivery duct 397 leading from its periphery at station G to the passageways 355 and 352, respectively, and a discharge duct 398 and a delivery duct 399 leading from its periphery at station H to the passageways 355 and 352 respectively.

At the end of each cycle of operation station A is at station X and the delivery passageway 346 in the valve member 335 is in communication with the pipes 288 and 228 through the ducts 368 and 369, respectively, and the delivery passageway 352 in the valve member 333 is in communication with the pipes 288 and 228 through the ducts 385 and 384 respectively.

Liquid delivered through either the passageway 346 or the passageway 352 may flow through the pipe 288 to operate the valve 280, and through the pipe 228 to operate the valves 216 and 224 (Fig. 20).

When the valve members 333 and 335 have been indexed one step forwardly and station B is at station X, the passageway 346 is in communication with the pipe 200 through the duct 370 and, when liquid is delivered to the passageway 346, it may flow to the cylinder 198 and operate the valve 190 (Fig. 19), and the passageway 349 is in communication with the pipe 199 through the duct 371 to allow the liquid expelled from the cylinder 196 by the operation of the valve 190 to escape into the drain pipe 61. The passageway 352 is in communication with the pipe 77 through the duct 387 and, when liquid is delivered to the passageway 352, it may flow to the motor 72 and operate the valve 62 (Fig. 18), and the passageway 355 is in communication with the pipe 78 through the duct 386 and the liquid expelled from the motor 73 by the operation of the valve 62 may escape into the drain pipe 61.

When the valve members 333 and 335 have been indexed forwardly another step and station C is at station X, the passageway 346 is in communication through the duct 373 with the pipe 257 which leads to the port 251 in the valve 224 (Fig. 20), the passageway 349 is in communication with the pipe 288 through the duct 372 and the liquid in the cylinder 287 on the valve 280 may be discharged into the drain pipe 61, the passageway 352 is in communication with the pipe 124 through the duct 389 and, when liquid is delivered to the passageway 352, it may flow to the cylinder 122 and operate the valve 111 (Fig. 18), the passageway 355 is in communication with the pipe 123 through the duct 388 and liquid discharged from the cylinder 120 by the operation of the valve 111 may flow into the drain pipe 61, and the passageway 355 is also in communication with the pipe 288 through the duct 390.

When the valve members 333 and 335 have been indexed forwardly a third step and station D is at station X, the passageway 346 is in communication with the pipe 124 through the duct 374 and, when liquid is supplied to the passageway 346, it may flow to the cylinder 122 to operate the valve 111 (Fig. 18), the passageway 349 is in communication with the pipe 123 through the duct 375 and the liquid discharged from the cylinder 120 by the operation of the valve 111 may flow into the drain pipe 61. The passageway 352 is in communication with the pipe 78 through the duct 391 and, when liquid is supplied to the passageway 352, it may flow to the motor 73 and operate the valve 62 (Fig. 18), and the passageway 355 is in communication with the pipe 77 through the duct 392 and the liquid expelled from the motor 72 by the operation of the valve 62 may flow into the drain pipe 61.

When the valve members 333 and 335 have been indexed forwardly a fourth step and station E is at station X, the pipe 199 is in communication with the passageway 346 through the duct 377 and with the passageway 355 through the duct 393, and the pipe 200 is in communication with the passageway 349 through the duct 376 and with the passageway 352 through the duct 394. If driving liquid is delivered through the passageway 346, the plunger 194 of the valve 190 (Fig. 19) is operated in one direction and, if driving liquid is delivered through the passageway 352, the plunger 194 is operated in the opposite direction.

When the valve members 333 and 335 have been indexed forwardly a fifth step and station F is at station X, the passageway 346 is in communication with the pipe 77 through the duct 378 and, when liquid is supplied to the passageway 346, it may flow to the motor 72 and operate the valve 62 (Fig. 18), the passageway 349 is in communication with the pipe 78 through the duct 379 and liquid expelled from the motor 73 by the operation of the valve 62 may flow into the drain pipe 61. The passageway 352 is in communication through the duct 395 and the pipe 257 with the port 251 in the valve 224 (Fig. 20).

When the valve members 333 and 335 have been indexed forwardly a sixth step and station G is at station X, the pipe 123 is in communication with the passageway 346 through the duct 381 and with the passageway 352 through the duct 397, and the pipe 124 is in communication with the passageway 349 through the duct 380 and with the passageway 355 through the duct 396. Driving liquid delivered through either the passageway 346 or the passageway 352 will enter the cylinder 120 and operate the valve 111 and the liquid expelled from the cylinder 122 by the operation of the valve 111 may flow into the drain pipe 61.

When the valve members 333 and 335 have been indexed forwardly a seventh step and station H is at station X, the passageway 346 is in communication with the pipe 78 through the duct 383 and, when liquid is supplied to the passageway 346, it may flow to the motor 73 and operate the valve 62, the passageway 349 is in communication with the pipe 77 through the duct 382 and the liquid expelled from the motor 72 by the operation of the valve 62 may flow into the drain pipe 61. The passageway 352 is in communication with the pipe 199 through the duct 399 and, when liquid is supplied to the passageway 352, it may flow to the cylinder 196 and operate the valve 190, and the passageway 355 is in communication with the pipe 200 through the duct 398 and the liquid discharged from the cylinder 198 by the operation of the valve 190 may flow into the drain pipe 61.

When the valve members 333 and 335 have been indexed another step, station A is at station X, as previously described, and the mechanism has completed a cycle of operation.

As shown in Fig. 16, the valve members 333 and 335 are provided upon the peripheries thereof with a number of small or fine annular grooves 400, one of which is arranged upon each side of each of the ducts 368 to 399 and alines with the wall or partition between adjacent bores 345.

When liquid under pressure is delivered to the passageway 346 or the passageway 352, it seeks to escape from the outlets of all of the ducts leading therefrom and exerts pressure upon the inner wall of the valve casing.

A limited quantity leaks out of these ducts and fills the grooves 400 which conduct it entirely around the periphery of the valve members, thereby providing a lubricating film of pressure liquid which exerts an equal pressure upon all points of the surface of the valve member and causes it to float freely within its casing.

Were is not for the grooves 400, the pressure exerted by the liquid against one side of the valve casing might make the rotary valve member bind against the opposite side thereof.

*Counter-clockwise operation.*

Assuming that a compartment arranged in the tier at the left is wanted at the loading station, for instance compartment No. 9, the operator closes a main switch 401 to start the pumps 66 and 106 and then pushes button No. 9 on the control switch 234.

With the pumps 66 and 106 running, hydraulic pressure from the pump 66 (Fig. 19) is now extended through the pipe 65, the valve 152, the pipe 150 and the duct 144 to the elevating cylinder 140. The opposite elevating cylinder 141 is open through the duct 145, the pipe 155, the valve 152 and the pipe 71 to the return side of the pump 66. The driving liquid is trapped in the cylinder 140 which is at the end of its stroke and abuts the stationary bracket 149.

At the same time, the hydraulic pressure in the pipe 65 extends to the control valve 190, thence through the pipe 188 to the locking motor 176 and through it to the toggle motor 183 and holds the pistons of both motors locked in operative position. The hydraulic pressure also extends through the pipe 188 to the locking motor 176ª and holds the key 174ª down against the end extension of the rack 139.

The toggle motor 183ª is in its released position and is open through the pipe 191 and the valve 190 to the return pipe 71.

Figure 2:
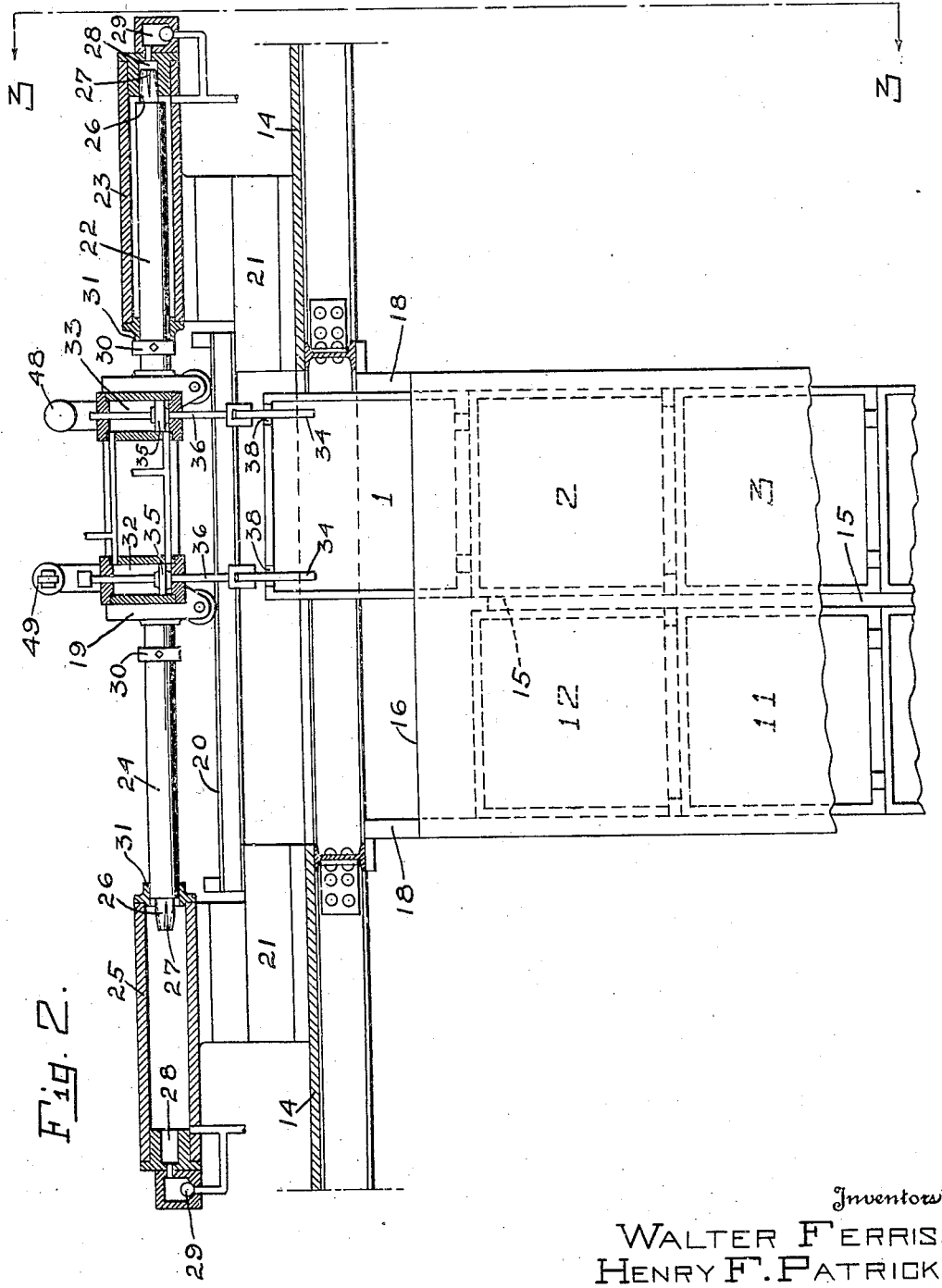
Fig. 2 is a front view of the upper part of the elevator showing, partly in section, the upper transfer mechanism which transfers cages or compartments from one tier to the other.

At the same time, the pressure is extended through the pipe 65 to the control valve 62 (Fig. 18) and thence through the pipe 67 to the upper ends of the four lifting motors 32 and 33 (Figs. 18 and 2) and holds their pistons 35 downward. The lower ends of the motors 32 and 33 are open through the pipe 69, the valve 62, and the return pipe 71 to the sump of the pump 66 (Fig. 19).

However, as all outlets from the pipe 65 are blocked at this time, the delivery of the pump 66 is discharged through its relief valve into its sump.

The pump 106 (Fig. 18) discharges through the pipe 105, the pipe 218, the valve 216 (Fig. 20), the pipe 220, and the return pipe 110 to the sump of the pump 106. Consequently, there is no pressure in any of the pipes leading to the various valves and motors that the pump 106 supplies with driving liquid.

The gear pump 54 (Fig. 18) supplies liquid under pressure through the choke 55 and the pipe 53 to the end chambers 52 of the trip valves 48, 49, 96 and 100 (Fig. 18) and the trip valves 201, 201ª, 202 and 202ª (Fig. 19), and this liquid holds the trip valve plungers 51 advanced as shown.

When the button 9 on the rotary switch 234 (Figs. 1 and 6) is depressed, the hook 313 latches behind the flange 314 and the movable contact 302 engages the circular stationary contacts 299 and 300 and closes the circuit from the power line 232 through the solenoid 229 and energizes it, as previously described.

The solenoid 229 now moves the plunger 225 of the valve 216 to the right and establishes communication between the ports 217 and 221 and opens the port 219 to the drain pipe 61.

The liquid discharged from the cylinder 227 at the right end of the valve 216 is exhausted through the pipe 228 and the duct 384, the passageway 352, the duct 353 and the port 342 of the selector valve 79 (Fig. 10) and through the pipe 244 and the pipe 245 (Fig. 20) to the accumulator 246.

Driving liquid from the pump 106 now flows through the pipes 105 and 218, the valve 216 (Fig. 20), the pipe 222 and the valve 224 into the pipe 244. Liquid from the accumulator 246 is at this point discharged into the pipe 244 and the combined volume of liquid is discharged from the pipe 244 through the port 342, the duct 353, the passageway 352 and the duct 385 in the selector valve 79 and into the pipe 288. The liquid in the pipe 288 now breaks through the resistance valve 289 (Fig. 20) and enters the cylinder 287 and forces the plunger 284 of the valve 280 to the right against the resistance of the spring 285. Liquid is exhausted from the right end of the valve 280 into the drain pipe 61.

The ports 279 and 281 in the valve 280 are now in communication with each other and driving liquid from the pump 106 flows through the pipes 105, 218 and 278, the valve 280, the pipe 282 and the pipe 261. One end of the pipe 261 is connected through the valve 224 to the pipe 263 which leads to the port 60 of the trip valve 96 (Fig. 18) which is blocked at this time by the plunger 95. Consequently, the liquid flows to the opposite end of the pipe 261 and operates the indexing motor 262 (Fig. 15) which indexes the selector valve 79 ahead one step in its rotation.

After the motor 262 has indexed the selector valve 79, its piston 359 remains in its advanced position as long as pressure is maintained in the pipe 261. A relatively small amount of liquid escapes from the pipe 261 through the pipe 366 and the choke 367 into the drain pipe 61, but this has no appreciable effect as long as pressure is maintained in the pipe 261. When, however, due to the subsequent indexing of the selector valve 79, delivery of liquid to the pipe 261 is discontinued, the spring 365 retracts the piston 359 and forces the liquid out of the motor 262 through the choke 367 into the drain pipe 61.

Station B is now at station X and liquid from the pipe 244 flows through the duct 353, the passageway 352, the duct 387 and the pipe 77 to the motor 72 at the left end of the control valve 62 (Fig. 18) and moves the plunger 63 to the right position, the liquid in the motor 73 being exhausted through the pipe 78, the duct 386, the passageway 355, and the channel 357 to the drain pipe 61.

When the plunger 63 in valve 62 has been moved to the right, the port 64 is in communication with the chamber 70, and driving liquid from the pump 66 (Fig. 19) then flows through the pipe 65, the valve 62 and the pipe 69 to the lower ends of the four lifting motors 32 and 33 and raises the pistons 35 and the hooks 34 engage the pins 37 (Fig. 3) in the uppermost compartment (No. 1) and lift it clear of the one beneath it. The liquid above the pistons 35 in the motors 32 and 33 is exhausted through the pipe 67 and the valve 62 to the return pipe 71.

Just before the lifting motors 32 complete the lifting stroke, the cams 44 and 44ª on the tail rods 45 engage the rollers 46 on the trip valves 48 and 49.

The cam 44 swings upon its pivot and the plunger 51 of the valve 48 remains stationary but the cam 44ª moves the plunger 51 of the valve 49 to the left, thereby opening the port 60 to the port 59.

Liquid from the pump 106 now flows through the supply pipe 105, the valve 49 and the pipes 362 and 264 (Fig. 15) to the indexing motor 265 and causes it to index the selector valve another one-eighth revolution and move station C to station X.

After the cam 44ª has passed above the roller 46, liquid from the gear pump 54 flows through the pipe 53 and the choke 55 into the cylinder 52 and slowly returns the plunger 51 of the valve 49 to its initial position, but the flow of liquid through the choke 55 is so slow that the selector valve 79 has been indexed before the plunger 51 closes the port 60.

When the plunger 51 of the valve 49 returns to its initial position, it blocks the port 60 and prevents further delivery of pressure liquid to the motor 265, and the spring 365 in that motor is able to retract its piston 359 and force the liquid to the left end of the motor through the choke 367 and the pipe 366 into the drain pipe 61.

With station C at station X, the spring 285 in the valve 280 (Fig. 20) is able to move the valve plunger 284 to the left and force liquid from the cylinder 287 through the pipe 288 via the check valve 290 and through the selector valve 79 (Fig. 10) via the duct 390, the passageway 355 and the channel 357 to the drain pipe 61.

The plunger 284 now blocks the port 281 and prevents further delivery of liquid to the pipes 282 and 261, thereby allowing the spring 365 in the motor 262 to retract the piston 359 and expel liquid from the motor 262 out through the choke 367 into the drain pipe 61. (Fig. 15).

At the same time, liquid from the pipe 244 flows through the selector valve 79 via the port 342, the duct 353, the passageway 352 and the duct 389, and then through the pipe 124 to the cylinder 122 and forces the plunger 114 of the control valve 111 (Fig. 18) to the left. Liquid is exhausted from the cylinder 120 through the pipe 123 and the selector valve 79 via the duct 388, the exhaust passageway 355 and the channel 357 to the drain pipe 61.

Liquid from the supply pipe 105 now flows through the control valve 111 and the pipe 116 to the right end of the cylinder 23 and through the check valve 29 to the dashpot 28 and acts upon the full area of the plunger 22 and drives it and the transfer carriage 19 to the left, thus carrying the uppermost compartment No. 1, which has been lifted by the hooks 34 to the left until the collar 30 abuts on the end 31 of the cylinder 25 and stops further movement. The compartment No. 1 is then vertically above the left tier of compartments. Just before the collar 30 strikes the end 31, the dashpot plunger 26 enters the dashpot 28 and slows down the mechanism, as previously described, so that the collar 30 engages the end 31 of the cylinder 25 without appreciable shock.

Liquid is expelled from cylinder 25 by the plunger 24 and flows through the pipe 101 and the check 92 to the interior of the cylinder 83 and forces the plunger 82 and the lower transfer carriage 80 to the right, thus transferring compartment No. 7 (Fig. 1) which is resting thereon from directly beneath the left tier of compartments to a position directly beneath the right tier of compartments.

The lower transfer carriage 80, due to the injection of liquid into the pipe 101 through the pipe 104 and the choke 107 as previously described, reaches the end of its stroke slightly in advance of the termination of the stroke of the upper transfer carriage 19. When the stop 102 abuts on the stop 103 on the cylinder 85 and stops the movement of the lower carriage 80, the liquid expelled into the pipe 101 by the continued movement of the plunger 24 is exhausted through the resistance valve 109 into the return pipe 110. Just before the stop 102 abuts the stop 103, the dashpot plunger 89 enters the dashpot 91 and decelerates the carriage 80 as previously described.

The liquid expelled from the interior of the cylinder 85 by the plunger 84 flows through the pipe 118 and the valve 111 to the return pipe 110.

Just before the end of the transfer stroke is reached, the pivoted cam 93 on the lower carriage 80 engages the roller 94 and raises the plunger 95 in the trip valve 96, thereby opening the exit port 60 to the intake port 59 and allowing liquid from the supply pipe 105 to flow through the trip valve 96 into the pipe 263. After the cam 93 has passed from contact with the roller 94, liquid from the gear pump 54 flows through the choke 55 and the pipe 53 into the operating cylinder 52 of the valve 96 and forces the plunger 95 slowly back to its initial position.

While the plunger 95 is raised, liquid flows from the supply pipe 105, through the valve 96, the pipe 263, the valve 224 (Fig. 20) and the pipe 261 to the indexing motor 262 and causes it to index the selector valve 79 ahead another step in its rotation, and the indexing is completed before the plunger of the trip valve 96 is retracted.

After the plunger 95 is retracted, the port 60 is closed and pressure is cut off from the pipe 263, thus allowing the piston 359 of the indexing motor 262 (Fig. 15) to be retracted by its spring 365 as heretofore described.

Station D is now at station X and liquid from the pump 106 flows through the pipes 105 and 218, the valve 216, the pipe 222, the valve 224, the pipe 244 and the selector valve 79 via the port 342, the duct 353, the passageway 352 and the duct 391, and then through the pipe 78 to the motor 73 and forces the plunger 63 of the valve 62 to the left. Liquid from the motor 72 on the left end of the valve 62 is exhausted through the pipe 77 and the selector valve 79 via the duct 392, the exhaust passageway 355, and the channel 357 to the drain pipe 61.

With the control valve plunger 63 (Fig. 18) to the left, driving liquid from the pump 66 (Fig. 19) flows through the pipe 65, the valve 62 and the pipe 67 to the upper end of the four lifting motors 32 and 33 and forces the pistons 35 and the hooks 34 downwardly, thereby lowering the compartment No. 1 upon the one directly beneath it, which is compartment No. 12 in this instance.

When a compartment is deposited upon one beneath it, the hooks 34 are disengaged automatically, as previously described, from the pins 37 in the upper corners of the compartment, thus leaving the compartment free to descend and recede from the hooks when that tier of compartments is lowered.

Liquid is exhausted from the lower ends of the motors 32 and 33 through the pipe 69, the valve 62 and the pipe 71 back to the return pipe 71 (Fig. 19) of the pump 66.

During the downward stroke of the four lifting motors (Fig. 18), the cams 44 and 44ª engage the rollers 46 on the valves 48 and 49. The cam 44ª swings upon its pivot and does not operate the valve 49 but the cam 44 operates the plunger 51 of the valve 48 and thereby opens the intake port 59 to the exit port 60.

Liquid from the pump 106 now flows through the pipe 105, the trip valve 48, the pipe 362 and the pipe 264 (Fig. 15) to the indexing motor 265 and causes it to index the selector valve 79 another step in its rotation. The plungers of the trip valve 48 (Fig. 18) and the indexing motor 265 (Fig. 15) are then retracted in the manner previously described.

Station E is now at station X and liquid from the pump 106 (Fig. 18) flows through the pipes 105 and 218, the valve 216 (Fig. 20), the pipe 222, the valve 224, the pipe 244 and the selector valve 79 (Fig. 10), via the port 342, the duct 353, the passageway 352 and the duct 394, and then through the pipe 200 into the cylinder 198 on the valve 190 (Fig. 19) and forces the plunger 194 to its upper position. Liquid is exhausted from the cylinder 196 at the top of the valve through the pipe 199 and the selector valve 79 (Fig. 10) via the duct 393, the exhaust passageway 355 and the channel 357 to the drain pipe 61.

Liquid from the pump 66 (Fig. 19) now flows through the pipe 65, the valve 190 and the pipe 191 to the upper end of the toggle motor 183 and forces its piston 182 downward to release the toggle 179. When the piston 182 reaches the end of its downward stroke, the driving liquid flows through the pipe 185 to the lower end of the locking motor 176 and raises the piston 177 to thereby disengage the locking key 174 from the keyway 175 in the end of the rack 139.

The liquid also flows through the pipe 191, the toggle motor 183ª and the pipe 185ª to the underside of the locking motor 176ª and forces its piston 177ª upward to disengage the locking key 174ª from contact with the end of the rack 139.

Liquid from the upper ends of the locking motors 176 and 176ª is exhausted through the pipe 188 and the valve 190 to the return pipe 71.

Just before the locking motor 176 completes its upward stroke, the pivoted cam 207 on the key 174 engages the roller 208 and actuates the trip valve 201 to thereby open its exit port 60 to its intake port 59.

Liquid now flows from the pump 106 (Fig. 18) through the pipes 105 and 215, the trip valve 201, the pipe 263, the valve 224 (Fig. 20) and the pipe 261 to the indexing motor 262 (Fig. 15) and causes it to index the selector valve 79 ahead another step in its rotation. The plungers of the valve 201 (Fig. 19) and the indexing motor 262 (Fig. 15) are then retracted in the manner previously described.

Station F is now at station X and liquid now flows from the pipe 244 through the selector valve 79 via the port 342, the duct 353, the passageway 352 and the duct 395, and then through the pipe 257, the valve 224 (Fig. 20) and the pipe 253 to the indexing motor 254 and advances its piston 293 to index the electric rotating switch 234 (Figs. 6, 7, 8 and 20) one step to the left or in a counter-clockwise direction.

As the pipe 168 is connected to the pipe 257 as shown in Fig. 16, liquid also flows through the pipe 168, the valve 164 (Fig. 19) and the pipe 165 to the cylinder 161 at the left end of the control valve 152 and forces the plunger 157 to the right, the liquid in the cylinder 159 at the right of the valve 152 being exhausted through the pipe 162 and the valve 164 to the drain pipe 61.

Driving liquid from the pump 66 now flows through the pipe 65, the valve 152, the pipe 155 and the duct 145 to the cylinder 141 and forces it and the rack 139 toward the right. Liquid is expelled from the cylinder 140 by the plunger 142 through the duct 144, the pipe 150, and the valve 152 into the return pipe 71.

As the rack 139 moves to the right, it rotates the two shafts 132 in one direction through the two gears 138 and thereby rotates the two shafts 130 in the opposite direction through the two gears 136 and the two gears 137.

Rotation of the shafts 132 causes the gears 131 thereon to raise the racks 126, and rotation of the shafts 130 causes the gears 129 thereon to lower the racks 125.

The upper ends of the racks 125 are in engagement with the projections 127 on the compartments No. 6 and No. 8 so that all of the compartments are supported by the racks 125 except compartment No. 7 which is resting on the lower transfer carriage 80 and has just been moved into the right tier, as previously described.

As the racks 126 ascend and the racks 125 descend, the upper ends of the four racks 126 under the right tier engage the projections 128 on compartment No. 7 and raise it, and all of the other compartments are simultaneously lowered by the racks 125 until the top of compartment No. 7 abuts the bottom of compartment No. 6.

Thereafter, the right tier of compartments is raised by four of the racks 126 thereunder and the left tier of compartments is simultaneously lowered by the four racks 125 thereunder.

One tier continues to ascend and the other tier to descend until compartment No. 2 is in the position formerly occupied by compartment No. 1 and compartment No. 8 is resting upon the transfer carriage 80 which is returned to its initial position after the compartment No. 7 is lifted therefrom and before the compartment No. 8 is fully lowered, as will be presently described.

At the same time, the racks 125 under the right tier of compartments continues to descend until they are in position to raise the next compartment which is transferred, and the racks 126 under the left tier of compartments continue to ascend until their upper ends engage the projections 128 on the compartment No. 9 and raise it slightly to free the compartment No. 8 therefrom.

When the rack 139 reaches the limit of its movement, a complete transfer of compartments has been accomplished, compartment No. 8 being supported upon the carriage 80 and the remaining compartments being supported by the racks 126.

Succeeding transfers of compartments are accomplished in exactly the same manner except that the lifting racks move in opposite directions during alternate transfers, that is, when the rack 139 is at the left, the racks 125 are up and the racks 126 are down and, when the rack 139 is at the right, the racks 125 are down and the racks 126 are up.

It is necessary that both the upper and lower transfer carriages complete their respective transverse movements in time to meet, respectively, the uppermost compartment in the ascending tier and the lowermost compartment in the descending tier.

Therefore, at the beginning of the elevating stroke of the rack 139, the cam 203 carried thereby engages the roller 204 and operates the trip valve 202, thereby opening its inlet port 59 to its exit port 60.

Liquid from the pump 106 (Fig. 18) now flows through the pipes 105 and 215, the valve 202, the pipe 269, the valve 224 (Fig. 20) and the pipe 264 to the indexing motor 265 (Fig. 15) and causes it to index the selector valve 79 ahead another step in its rotation.

The plungers of the valve 202 and the motor 265 are thereafter retracted as previously described and, the delivery of liquid to the pipe 257 being discontinued by the indexing of the selector valve 79, the piston 293 of the switch indexing motor 254 (Fig. 20) is retracted by its spring 294 and expels liquid from the motor 254 through the choke 295 into the drain pipe 61.

Indexing the selector valve 79 moves station G to station X and liquid from the pump 106 (Fig. 18) flows through the pipes 105 and 218, the valve 216 (Fig. 20), the pipe 222, the valve 224, the pipe 244 and the selector valve 79 (Fig. 10) via the port 342, the duct 353, the passageway 352 and the duct 397 and then through the pipe 123 to the cylinder 120 of the valve 111 (Fig. 18) and forces the plunger 114 to the right. Liquid from the cylinder 122 is exhausted through the pipe 124 and the selector valve 79 (Fig. 10) via the duct 396, the exhaust passageway 355, the duct 356 and the channel 357 to the drain pipe 61.

Liquid from the pump 106 now flows through the pipe 105, the valve 111 and the pipe 118 to the lower transfer cylinder 85 and moves the plunger 84 and the carriage 80 to the left.

Liquid is expelled from the cylinder 83 by the plunger 82 and flows through the pipe 101 into the cylinder 25 and forces the plunger 23 and the upper transfer carriage 19 to the right. Liquid in the cylinder 23 is expelled by the plunger 22 and exhausted through the pipe 116 and the valve 111 to the return pipe 110.

At the same time, a limited quantity of liquid from the pump 106 flows through the pipes 105 and 104, the choke 107, the check valve 108 and the pipe 101 into the cylinder 25, thereby advancing the carriage 19 ahead of the carriage 80 and insuring that the plunger 24 completes its stroke.

After the carriage 19 stalls at the end of its movement, the liquid expelled from cylinder 83 by the plunger 82 is exhausted through the resistance valve 109 into the return pipe 110.

The carriages 19 and 80 are decelerated and brought to rest without appreciable shock by the liquid trapped in the dashpots 28 and 91, respectively.

Just before the lower transfer carriage 80 reaches the end of its movement to the left, the pivoted cam 97 carried thereby engages the roller 98 and operates the trip valve 100 to open its inlet port 59 to its exit port 60. Liquid from the pump 106 now flows through the pipe 105, the trip valve 100, the pipe 269, the valve 224 (Fig. 20) and the pipe 264 to the indexing motor 265 (Fig. 15) and advances its plunger to index selector valve 79 another step ahead in its rotation.

The plungers of the valve 100 and the motor 265 are thereafter retracted to their initial positions, as previously described.

Station H is now at station X and liquid from the pipe 244 flows through the selector valve 79 (Fig. 10) via the port 342, the duct 353, the passageway 352 and the duct 399 and then through the pipe 199 to the upper cylinder 196 on the control valve 190 (Fig. 19) and forces the plunger 194 downwardly. Liquid is exhausted from the cylinder 198 through the pipe 200 and the selector valve 79 via the duct 398, the passageway 355, the duct 356 and the channel 357 to the drain pipe 61.

With the control valve plunger 194 in its downward position, driving liquid from the pump 66 flows through the pipe 65, the valve 190 and the pipe 188 to the upper ends of the two locking motors 176 and 176$^a$ and forces the pistons 177 and 177$^a$ downwardly until the ends of the keys 174 and 174$^a$ thereof contact with the top surface of the rack 139 and slide thereon.

When the rack 139 reaches the end of its stroke, the key 174 will remain in contact therewith and the key 174$^a$ will drop into the hole 175$^a$. Then the piston 177$^a$ will descend until it reaches the bottom of its stroke and uncovers the opening to the pipe 186ª and allows the driving liquid to flow therethrough to the lower end of the toggle motor 183ª and force the piston 182ª upwardly and actuate the toggle 179ª to force the key 174ª against the side of the keyway 175ª, thereby locking the elevating mechanism securely in position and holding the end of the cylinder 141 firmly against the stationary support 149ª.

As the cylinder 140 nears the end of its stroke, the arm 173 thereon engages the collar 172 on the valve stem 170 and moves the plunger 169 of the reversing valve 164 (Fig. 19) to the right, thereby opening the port 166 to the drain pipe 61 and opening the port 163 to the port 167 so that, when the selector valve 79 is indexed during the next cycle of operation to bring station F to station X and pressure liquid is supplied to the pipe 168, the liquid may flow through the valve 164 and the pipe 162 to the cylinder 159 and move the plunger 157 of the control valve 152 to the left, and so that the liquid in the cylinder 161 may be exhausted through the pipe 165 and the valve 164 to the drain pipe 61.

Just before the rack 139 reaches the end of its stroke, the cam 205 carried thereby engages the roller 206 and operates trip valve 202ª and opens its inlet port 59 to its exit port 60. Liquid from the pump 106 (Fig. 18) now flows through the pipes 105 and 215, the valve 202ª, the pipe 269, the valve 224 (Fig. 20) and the pipe 264 to the indexing motor 265 (Fig. 15) and causes it to index the selector valve 79 another step.

The valve members 333 and 335 have now made a complete revolution and station A is at station X, as shown in the drawings. Thereafter, the plungers of the valve 202ª and the motor 265 are retracted as previously described.

Liquid from the pump 106 (Fig. 18) now flows through the pipes 105 and 218, the valve 216 (Fig. 20), the pipe 222, the valve 224, the pipe 244 and into the passageway 352 of the selector valve 79 (Fig. 10) through the port 342 and the duct 353.

From the passageway 352, pressure extends through the duct 384 and the pipe 228 to the cylinder 227 on the valve 216 (Fig. 20), and also through the duct 385 and the pipe 288 to the resistance valve 289 (Fig. 20).

If the compartment which was wanted has arrived at the loading station, the switch 234 (Fig. 6) has been opened by the contact arm 305 having been previously rotated past the end 317 of the annular flange 314 to allow the spring 312 to move the contact 302 out of engagement with the contacts 299 and 300, thereby deenergizing the solenoid 229 (Fig. 20) and allowing the pressure liquid delivered to the cylinder 227 through the pipe 228 to return the valve plunger 225 to its initial position.

In the example under consideration, however, the compartment wanted (No. 9) has not arrived at the loading station and the solenoid is still energized and holds the valve plunger 225 to the right against the pressure in the cylinder 227.

The pressure then rises in the pipe 288 and liquid breaks through the resistance valve 289 and enters the cylinder 287 and forces the plunger 284 of the valve 280 to the right and starts a second cycle of operation by allowing liquid to flow from the pipe 278 through the valve 280 and the pipes 282 and 261 to the indexing motor 262 and cause it to index the selector valve 79 one step ahead and move station B to station X.

The cycles follow each other in succession until the arm 305 which was depressed passes beyond the end of the annular flange 314 and the switch 234 opens. The current cycle is then completed and the several mechanisms come to rest.

During the second cycle of operation, the switch 234 is indexed ahead another step and the operations performed during the first cycle are repeated except that the rack moves to the left, the racks 125 ascend and the racks 126 descend, compartment No. 2 is transferred to the top of the tier at the left and compartment No. 8 is transferred to the bottom of the tier at the right.

The third cycle is the same as the first cycle, compartment No. 3 is transferred to the top of the tier at the left, compartment No. 9 is transferred to the bottom of the tier at the right, the arm 305 which carries button No. 9 passes beyond the end 317 of the flange 314 and the switch 234 opens, and the elevator comes to rest when compartment No. 9 has been raised to the loading station.

*Clockwise operation.*

If the compartment which is wanted at the loading station is located in the tier at the right, the push button corresponding to that compartment is located on the right half of the switch 234 and, when this button is depressed and the switch 401 is closed, the elevating mechanism begins its cycle of operation and lifts the compartment clear of the lower transfer carriage 80 before the transfer mechanisms start to operate.

However, the transfer mechanism starts immediately thereafter and completes the first half of its cycle ahead of the elevating mechanism in order that the lower transfer carriage 80 may be in position to receive the lower compartment in the tier at the right when it reaches the limit of its downward movement.

Except for the several streams of liquid which flow through the valve 224 (Fig. 20) being diverted into different paths and except for the selector valve 79 (Fig. 10) delivering liquid to the several distributing pipes at different points in each cycle of operation in order to change the sequence of certain operations as outlined above, the valves, motors and mechanisms function in substantially the same manner as when the elevator is operated in a counter-clockwise direction. Consequently, the operation of these valves, motors and mechanisms will be described but briefly.

Assuming that the compartment wanted at the level of the floor 13 for the purpose of loading or unloading is located at the right tier, for instance compartment No. 2 (Fig. 1), the electric switch 401 is closed manually by the operator to start the pumps 66 and 106.

The hydraulic pressure and distribution of liquid is now the same as previously described.

The operator then depresses the arm No. 2 on the electric rotary switch 234 (Figs. 1 and 6) and the hook 313 thereon latches behind the flange 314 as previously described. The contact 302 on the arm No. 2 engages the circular contacts 299, 300 and 301 and closes the circuits through the solenoids 229 and 273 (Fig. 20) to energize them.

The solenoid 229 moves the plunger 225 of the valve 216 to the right and liquid is expelled from the cylinder 227 as previously described.

The solenoid 273 moves the plunger 236 of the valve 224 to the right and liquid in the cylinder 271 at the right of the valve 224 is expelled through the pipe 272 into the pipe 228 and exhausted with the liquid expelled from the cylinder 227 of the valve 216.

The pump 106 (Fig. 18) now delivers liquid through the pipes 105 and 218, the valve 216 (Fig. 20), the pipe 222, the valve 224, the pipe 247 and the duct 347 to the distributing passageway 346 of the selector valve 79 (Fig. 10) and provides the passageway 346 with a constant supply of pressure liquid as long as the plungers of the valves 216 and 224 remain at the right.

The pipe 228 is now in communication with the passageway 346 through the duct 369 and pressure extends therethrough to cylinder 227 on the valve 216 and from the pipe 228 through the pipe 272 to the cylinder 271 on the valve 224.

The pressure in the cylinders 227 and 224 urges the plungers 225 and 236 of these valves toward the left but they are held by the solenoids 229 and 273 against movement until the switch 234 is opened at a subsequent point in a cycle of operation during which the desired compartment arrives at the loading station.

The pipe 288 is also in communication with the passageway 346 through the duct 368 and liquid breaks through the resistance valve 289 and moves the plunger 284 of the valve 280 to the right, thereby allowing liquid to reach the indexing motor 262 (Fig. 16) and cause it to index the selector valve 79 one step ahead and move station B to station X.

Liquid now flows from the passageway 346 through the pipe 200 to operate the valve 190 (Fig. 19) and liquid is exhausted from the cylinder 196 of the valve 190 through the pipe 199 and the selector valve 79 (Fig. 10) via the duct 371, the passageway 349, the duct 350 and the channel 351 to the drain pipe 61.

Liquid from the pump 66 (Fig. 19) now flows through the valve 190 to the toggle motors 183 and 183ª and the locking motors 176 and 176ª and operates them to release the rack 139 and to cause the pivoted cam 207 on the key 174 to operate the trip valve 201 and thereby cause the selector valve 79 (Fig. 15) to be indexed ahead another step, as previously described.

Station C is now at station X, and the spring 285 retracts the plunger 284 of the valve 280 (Fig. 20) and exhausts liquid from the cylinder 287 through the pipe 288 and the selector valve 79 (Fig. 10) via the duct 372 and the passageway 349 which is always open to the drain pipe 61.

Liquid may now flow from the passageway 346 in the selector valve 79 through the duct 373, the pipe 257, the valve 224 and the pipe 255 to the indexing motor 256 and cause it to index the switch 234 (Figs. 6–8).

If the compartment which was wanted is in position to be moved to the loading station during the current cycle of operation, the hook 313 on arm 305 which was depressed slips off the end 318 of the annular flange 314, the circuit is opened and the solenoids 229 and 273 deenergized, and the elevator will come to rest upon the completion of the current cycle.

In the present example, however, more than one cycle is required to bring the desired compartment to the loading station and the switch 234 remains closed and another cycle will succeed the current cycle.

Liquid also flows from the pipe 257 through the branch pipe 168 (Fig. 16), the reversing valve 164 (Fig. 19) and the pipe 165 to the cylinder 161 and moves the plunger 157 of the control valve 152 (Fig. 19) to the right.

Figure 1:
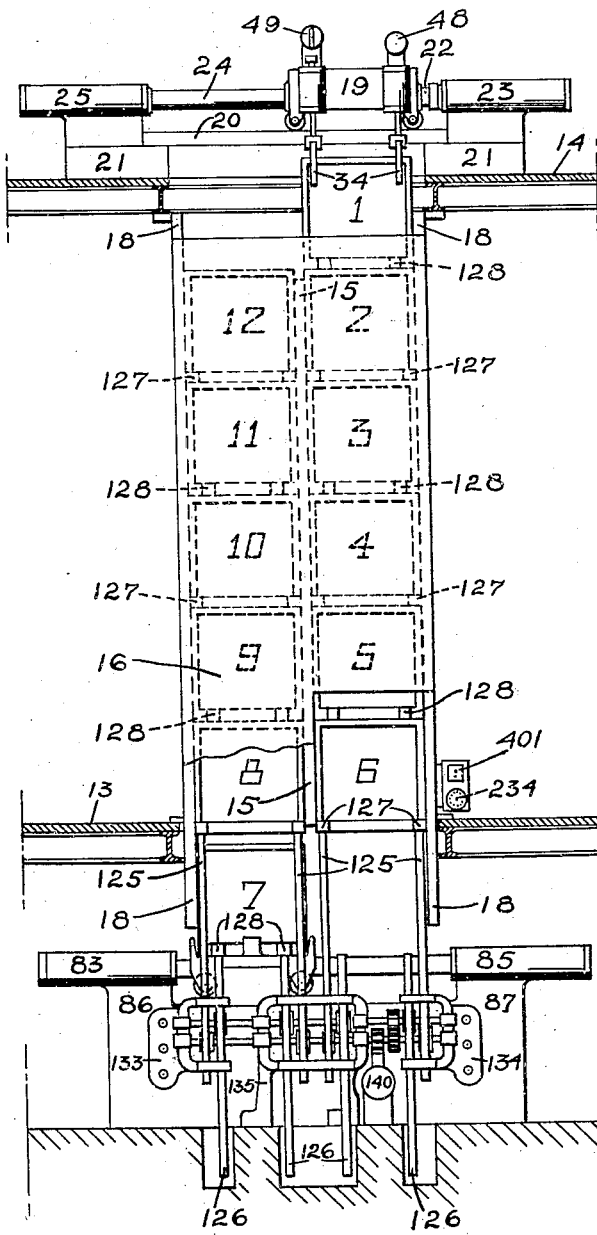
Fig. 1 is a front elevation showing the two tiers of cages or storage compartments in the positions occupied when the elevator is idle.

The pump 66 now delivers liquid through the valve 152 to the lifting cylinder 141, thereby moving the rack 139 to the right and raising the lifting racks 126 and lowering the lifting racks 125 (Fig. 1).

As the right tier of compartments is supported upon four racks 125, it will be lowered as the racks 125 descend and, as the projections 128 on the compartment No. 7 are in alinement with four of the racks 126, the left tier will be raised as the racks 126 ascend.

It is necessary that the lower transfer carriage 80 be in position to receive the bottom compartment in the tier at the right before the elevating racks reach their limit of movement.

Therefore, immediately after the rack 139 starts to move, the cam 203 thereon operates the trip valve 202 and liquid from the pump 106 flows through the pipes 105 and 215, the valve 202, the pipe 269, the valve 224 (Fig. 20) and the pipe 261 to the indexing motor 262 (Fig. 15) and causes it to index the selector valve 79 another step and move station D to station X.

Liquid from the distributing passageway 346 in the selector valve 79 (Fig. 10) now flows through the duct 374 and the pipe 124 to the cylinder 122 and moves the plunger 114 of the control valve 111 (Fig. 18) to the left and the liquid in the cylinder 120 is exhausted through the pipe 123 and the duct 375 to the exhaust passageway 349 of the selector valve 79.

Liquid from the pump 106 now flows through the valve 111 to the upper transfer cylinder 23 and moves the carriage 19 to the left and the liquid exhausted from the upper transfer cylinder 25 enters the lower transfer cylinder 83 and moves the carriage 80 to the right, the carriages 19 and 80 arriving at their destinations before the elevating mechanism completes its operation.

Just before the lower transfer carriage 80 reaches the end of its movement, the cam 93 carried thereby operates the trip valve 96 and causes the selector valve 79 (Fig. 15) to be indexed ahead one step to move station E to station X.

The pipes 199 and 200 are now in communication, respectively, with the distributing passageway 346 and the exhaust passageway 349 of the selector valve 79 (Fig. 10) through the ducts 377 and 376, and the plunger 194 of the control valve 190 (Fig. 19) is returned to its initial position so that driving liquid from the pump 66 reaches the locking cylinders 176 and 176ª and the rack 139 is locked in position when it reaches the end of its movement, as previously described.

When the rack 139 reaches the end of its movement, compartment No. 6 is resting on the lower carriage 80, the upper carriage 19 is in alinement with the left hand tier, and the compartment No. 12 is in position to be engaged by the hooks 34 when the lifting motors 32 and 33 are actuated.

Just before the cylinder 140 (Fig. 19) reaches the end of its stroke, the arm 173 thereon engages the collar 172 and moves the plunger 169 of the valve 164 to the right, thereby placing it in position to reverse the control valve 152 as soon as there is hydraulic pressure supplied in the pipe 168 which leads from the selector valve 79. This pressure, however, is not supplied in the pipe 168 until a period in the next succeeding cycle of operation (at station C), thus leaving the elevating cylinders 140 and 141 and the rack 139 at the right until that period in the next cycle has been reached.

Just before the rack 139 reaches the limit of its movement, the cam 205 operates the valve 202ª and driving liquid from the pump 106 flows through the pipes 105 and 215, the valve 202ª, the pipe 269, the valve 224 (Fig. 20) and the pipe 261 to the indexing motor 262 and causes it to index the selector valve 79 ahead one step so that station F is at station X.

The ports 378 and 379 are now in communication through the pipes 77 and 78 with the cylinders 74 and 75 on the control valve 62 (Fig. 18), and the valve plunger 63 is shifted to the right so that liquid from the pump 66 enters the lifting motors 32 and 33 and causes them to raise the hooks 34 and lift the uppermost cage 12 clear of the one beneath it.

As the pistons 35 of the lifting cylinders 32 finish their upward movement, the pivoted cam 44ª operates the valve 49 and liquid from the pipe 105 flows through the pipe 362 to the indexing motor 265 (Fig. 15) and causes it to index the selector valve 79 ahead one step and move station G to station X.

The ducts 381 and 380 are now in communication through the pipes 123 and 124 with the cylinders 120 and 122 on the control valve 111 (Fig. 18), and the valve plunger 113 is shifted to the right so that driving liquid enters the lower transfer cylinder 85 and forces the plunger 84 and the carriage 80 to the left and thereby causes the upper transfer carriage 19 to move to the right. The uppermost compartment 12 thus is transferred to the right hand tier of cages and the lowermost compartment 6 is transferred to the left hand tier.

Just before the lower transfer carriage 80 reaches the limit of its movement to the left, the pivoted cam 97 carried thereby operates the valve 100 and liquid from the pump 106 flows through the pipe 105, the valve 100, the pipe 269, the valve 224 (Fig. 20) and the pipe 261 to the indexing motor 262 (Fig. 15) and causes it to index the selector valve 79 ahead one step and move station H to station X.

The ducts 382 and 383 are now in communication through the pipes 77 and 78 with cylinders 74 and 75 on the control valve 62 (Fig. 18) and the plunger 63 is shifted to the left so that liquid from the pump 66 enters the lifting motors 32 and 33 and causes them to lower the hooks 34, thereby depositing the uppermost compartment No. 12 upon the compartment No. 1 directly beneath it in the right hand tier.

Just before the pistons 35 of the motors 32 reach the limit of their downward stroke, the pivoted cam 44 operates the valve 48 and liquid from the pipe 105 flows through the valve 48 and the pipe 362 to the indexing motor 265 (Fig. 15) and causes it to index the selector valve 79 ahead one step and move station A to station X and a cycle of operation has been completed.

The duct 368 is again in communication with the pipe 288 and the duct 369 is again in communication with the pipe 228.

If the switch 234 (Figs. 6-8) opened during the cycle just completed, liquid flows through the pipes 228 and 272 and retracts the plungers 225 and 236 of the valves 216 and 224 to their initial positions and the elevator comes to rest.

If the desired compartment has not arrived at the loading station, the switch 234 has not opened and the solenoids 229 and 273 hold the valve plungers 225 and 236 against the pressure of the liquid, and then the liquid breaks through the resistance valve 289 and starts another cycle of operation as described above.

The cycles automatically follow each other in succession until the desired compartment reaches the loading station and then the current cycle of operation is completed and the elevator comes to rest.

The invention herein set forth is susceptible of various modifications and adaptations without departing from the scope thereof as hereafter claimed.

The invention is hereby claimed as follows:

1. In a hydraulically operated mechanism having its moving parts operated by hydraulic motors connected into a hydraulic circuit supplied with liquid from a pressure source, the combination of a hydraulically operated control valve for controlling each of said motors, a selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, means for operating said selector valve, and a number of separate means responsive to the movements created by said motors for operating said valve operating means.

2. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, means for indexing said selector valve, and a number of separate means responsive to the movements created by said motors for operating said valve indexing means.

3. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, a hydraulic motor for indexing said selector valve, and a number of separate valves operated in response to movements created by certain of said motors for directing liquid to said valve indexing motor to operate the same.

4. In a hydraulically operated mechanism having its moving parts operated by hydraulic motors connected into a hydraulic circuit supplied with liquid from a pressure source, the combination of a hydraulically operated control valve for controlling each of said motors, a selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, means for operating said selector valve, a number of separate means responsive to the movements created by said motors for operating said valve operating means, and a direction valve connected into said circuit and operable to change the sequence of certain operations during each cycle.

5. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, means for indexing said selector valve, a number of separate means responsive to the movements created by said motors for operating said valve indexing means, and a direction valve connected into said circuit and operable to change the sequence of certain operations during each cycle.

6. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, a hydraulic motor for indexing said selector valve, a number of separate valves operated in response to movements created by certain of said motors for directing liquid to said valve indexing motor to operate the same, and a direction valve connected into said circuit and operable to change the sequence of certain operations during each cycle.

7. In a hydraulically operated mechanism having its moving parts operated by hydraulic motors connected into a hydraulic circuit supplied with liquid from a pressure source, the combination of a hydraulically operated control valve for controlling each of said motors, a selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, means for operating said selector valve, a number of separate means responsive to the movements created by said motors for operating said valve operating means, and means for maintaining said cycle initiating means operative during a predetermined number of successive cycles of operation.

8. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, means for indexing said selector valve, a number of separate means responsive to the movements created by said motors for operating said valve indexing means, and means for maintaining said cycle initiating means operative during a predetermined number of successive cycles of operation.

9. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, means for initiating the delivery of liquid to said selector valve to initiate a cycle of operation, a hydraulic motor for indexing said selector valve, a number of separate valves operated in response to movements created by certain of said motors for directing liquid to said valve indexing motor to operate the same, and means for maintaining said cycle initiating means operative during a predetermined number of successive cycles of operation.

10. In a hydraulically operated mechanism having its moving parts operated by hydraulic motors connected into a hydraulic circuit supplied with liquid from a pressure source, the combination of a hydraulically operated control valve for controlling each of said motors, a selector valve for distributing pressure liquid to said valves in a predetermined sequence to operate the same and thereby direct pressure liquid to said motors in sequence to cause the same to move the several parts of said mechanism through a cycle of operation, a valve having an electromagnet to operate it to control the delivery of liquid to said selector valve, a rotary switch for controlling said electromagnet and having means for keeping it closed during a predetermined number of successive cycles of operation to thereby cause said magnetically operated valve to remain open until the completion of the last of said predetermined number of cycles, and means for operating said selector valve during each cycle of operation.

11. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, a valve having an electromagnet to operate it to control the delivery of liquid to said selector valve, a rotary switch for controlling said electromagnet and having means for keeping it closed during a predetermined number of successive cycles of operation to thereby cause said magnetically operated valve to remain open until the completion of the last of said predetermined number of cycles, and means for indexing said selector valve during each cycle of operation.

12. In a hydraulically operated mechanism having its moving parts operated by hydraulic motors connected into a hydraulic circuit supplied with liquid from a pressure source, the combination of a hydraulically operated control valve for controlling each of said motors, a selector valve for distributing pressure liquid to said valves in a predetermined sequence to operate the same and thereby direct pressure liquid to said motors in sequence to cause the same to move the several parts of said mechanism through a cycle of operation, a valve having an electromagnet to operate it to control the delivery of liquid to said selector valve, a rotary switch for controlling said electromagnet and having means for keeping it closed during a predetermined number of successive cycles of operation to thereby cause said magnetically operated valve to remain open until the completion of the last of said predetermined number of cycles, means for operating said selector valve during each cycle of operation, and a plurality of means responsive to movements created by certain of said motors for operating said valve operating means.

13. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, a valve having an electromagnet to operate it to control the delivery of liquid to said selector valve, a rotary switch for controlling said electromagnet and having means for keeping it closed during a predetermined number of successive cycles of operation to thereby cause said magnetically operated valve to remain open until the completion of the last of said predetermined number of cycles, an indexing motor for indexing said selector valve progressively during each cycle of operation, and a number of valves operated in response to movements created by certain of said motors for controlling said indexing motor.

14. In a hydraulically operated mechanism having its moving parts operated by hydraulic motors connected into a hydraulic circuit supplied with liquid from a pressure source, the combination of a hydraulically operated control valve for controlling each of said motors, a selector valve for distributing pressure liquid to said valves in a predetermined sequence to operate the same and thereby direct pressure liquid to said motors in sequence to cause the same to move the several parts of said mechanism through a cycle of operation, a valve having an electromagnet to operate it to control the delivery of liquid to said selector valve, a rotary switch for controlling said electromagnet and having means for keeping it closed during a predetermined number of successive cycles of operation to thereby cause said magnetically operated valve to remain open until the completion of the last of said predetermined number of cycles, a direction valve connected into said circuit between said magnetically operated valve and said selector valve and operable to change the sequence of certain operations during each cycle, and means for operating said selector valve during each cycle of operation.

15. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, a valve having an electromagnet to operate it to control the delivery of liquid to said selector valve, a rotary switch for controlling said electromagnet and having means for keeping it closed during a predetermined number of successive cycles of operation to thereby cause said magnetically operated valve to remain open until the completion of the last of said predetermined number of cycles, a direction valve connected into said circuit between said magnetically operated valve and said selector valve and operable to change the sequence of certain operations during each cycle, and means for indexing said selector valve during each cycle of operation.

16. In a hydraulically operated mechanism having its moving parts operated by hydraulic motors connected into a hydraulic circuit supplied with liquid from a pressure source, the combination of a hydraulically operated control valve for controlling each of said motors, a rotary selector valve for distributing pressure liquid to said valves in a predetermined sequence to operate the same and thereby direct pressure liquid to said motors in sequence to cause the same to move the several parts of said mechanism through a cycle of operation, a valve having an electromagnet to operate it to control the delivery of liquid to said selector valve, a rotary switch for controlling said electromagnet and having means for keeping it closed during a predetermined number of successive cycles of operation to thereby cause said magnetically operated valve to remain open until the completion of the last of said predetermined number of cycles, a direction valve connected into said circuit between said magnetically operated valve and said selector valve and operable to change the sequence of certain operations during each cycle, an indexing motor for indexing said selector valve progressively during each cycle of operation, and a number of valves operated in response to movements created by certain of said motors for controlling said indexing motor.

17. In a hydraulically operated mechanism having its moving parts operated by hydraulic motors connected into a hydraulic circuit supplied with liquid from a pressure source, the combination of a hydraulically operated control valve for controlling each of said motors, a rotary selector valve having two separate distributing passageways arranged in its rotor and connected at all times to separate supply pipes in said hydraulic circuit and ducts leading radially outward at several angles from said passageways to be selectively connected to said control valves and deliver liquid thereto to operate the same in a predetermined sequence as said rotor is rotated and thereby cause said motors to be operated in sequence, a valve connected between said supply pipes and said source and operable to direct liquid into either one or the other of said supply pipes and thereby change the sequence in which said motors are operated, and means responsive to the movements created by said motors for rotatively indexing said selector valve.

18. In a hydraulically operated mechanism having its moving parts operated by hydraulic motors connected into a hydraulic circuit supplied with liquid from a pressure source, the combination of a hydraulically operated control valve for controlling each of said motors, a rotary selector valve having two separate distributing passageways arranged in its rotor and connected at all times to separate supply pipes in said hydraulic circuit and ducts leading radially outward at several angles from said passageways to be selectively connected to said control valves and deliver liquid thereto to operate the same in a predetermined sequence as said rotor is rotated and thereby cause said motors to be operated in sequence, a valve connected between said supply pipes and said source and operable to direct liquid into either one or the other of said supply pipes and thereby change the sequence in which said motors are operated, a hydraulic motor for progressively indexing said selector valve, and a number of separate valves operated in response to movements created by certain of said motors for controlling said indexing motor to cause the same to index said selector valve through a complete revolution during each cycle of operation.

19. In a hydraulically operated mechanism having its moving parts operated by hydraulic motors connected into a hydraulic circuit supplied with liquid from a pressure source, the combination of a hydraulically operated control valve for controlling each of said motors, a rotary selector valve having two separate distributing passageways arranged in its rotor and connected at all times to separate supply pipes in said hydraulic circuit and ducts leading radially outward at several angles from said passageways to be selectively connected to said control valves and deliver liquid thereto to operate the same in a predetermined sequence as said rotor is rotated and thereby cause said motors to be operated in sequence, a valve connected between said supply pipes and said source and operable to direct liquid into either one or the other of said supply pipes and thereby change the sequence in which said motors are operated, means responsive to the movements created by said motors for rotatively indexing said selector valve, and means for causing said indexing means to index said selector valve through a predetermined number of revolutions and thereby cause said mechanism to complete a like number of cycles before coming to rest.

20. In a hydraulically operated mechanism having its moving parts operated by hydraulic motors connected into a hydraulic circuit supplied with liquid from a pressure source, the combination of a hydraulically operated control valve for controlling each of said motors, a rotary selector valve having two separate distributing passageways arranged in its rotor and connected at all times to separate supply pipes in said hydraulic circuit and ducts leading radially outward at several angles from said passageways to be selectively connected to said control valves and deliver liquid thereto to operate the same in a predetermined sequence as said rotor is rotated and thereby cause said motors to be operated in sequence, a valve connected between said supply pipes and said source and operable to direct liquid into either one or the other of said supply pipes and thereby change the sequence in which said motors are operated, a hydraulic motor for progressively indexing said selector valve, a number of separate valves operated in response to movements created by certain of said motors for controlling said indexing motor to cause the same to index said selector valve through a complete revolution during each cycle of operation, and means for causing said indexing motor to index said selector valve through a predetermined number of revolutions and thereby cause said mechanism to complete a like number of cycles before coming to rest.

WALTER FERRIS.
HENRY F. PATRICK.